(12) United States Patent
Tsujii et al.

(10) Patent No.: US 8,746,717 B2
(45) Date of Patent: Jun. 10, 2014

(54) SADDLE RIDING TYPE VEHICLE

(75) Inventors: Eiichirou Tsujii, Shizuoka (JP);
Kazuhiro Nishida, Shizuoka (JP);
Atsushi Imai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/515,693

(22) PCT Filed: Dec. 6, 2010

(86) PCT No.: PCT/JP2010/007092
§ 371 (c)(1),
(2), (4) Date: Jun. 13, 2012

(87) PCT Pub. No.: WO2011/074204
PCT Pub. Date: Jun. 23, 2011

(65) Prior Publication Data
US 2012/0248717 A1    Oct. 4, 2012

(30) Foreign Application Priority Data

Dec. 17, 2009 (JP) ................................. 2009-286584

(51) Int. Cl.
*B60G 21/05* (2006.01)
(52) U.S. Cl.
USPC .................................. 280/124.103; 280/5.32
(58) Field of Classification Search
USPC .......................................... 280/124.103, 5.32
See application file for complete search history.

(56) References Cited

U.S. PATENT DOCUMENTS

| 4,133,551 A * | 1/1979 | Biskup ........................ 280/221 |
| 4,740,004 A * | 4/1988 | McMullen ................... 280/269 |
| 2004/0051269 A1* | 3/2004 | Bouton ................. 280/124.103 |
| 2004/0144591 A1* | 7/2004 | Kuroki et al. ................. 180/337 |
| 2005/0275181 A1* | 12/2005 | MacIsaac ............... 280/124.103 |
| 2007/0151780 A1* | 7/2007 | Tonoli et al. ................. 180/65.1 |
| 2007/0262548 A1* | 11/2007 | Rawlinson ............. 280/124.103 |

(Continued)

FOREIGN PATENT DOCUMENTS

| EP | 0 606 191 A1 | 7/1994 |
| JP | 9-207856 A | 8/1997 |
| JP | 2003-341577 A | 12/2003 |

(Continued)

OTHER PUBLICATIONS

JP2004122869A machine translation.*
Official Communication issued in International Patent Application No. PCT/JP2010/007092, mailed on Mar. 15, 2011.

*Primary Examiner* — Paul N Dickson
*Assistant Examiner* — Barry Gooden, Jr.
(74) *Attorney, Agent, or Firm* — Keating & Bennett, LLP

(57) ABSTRACT

A saddle riding type vehicle includes a right wheel and a left wheel, a right lower arm and a left lower arm swingably provided on a vehicle arranged to support the right wheel and the left wheel to be movable up and down, and a right stopper member and a left stopper member arranged to contact the right lower arm and the left lower arm to stop the vehicle body from leaning in excess of a predetermined amount, which do not stop leaning of the vehicle body when the lean amount of the vehicle body is less than the predetermined amount. The vehicle body is arranged to lean freely when the lean amount of the vehicle body is in a range not exceeding the predetermined amount. Therefore, the rider can preferably travel comfortably.

15 Claims, 20 Drawing Sheets

(56) References Cited

U.S. PATENT DOCUMENTS

| | | | |
|---|---|---|---|
| 2008/0258415 A1* | 10/2008 | Melcher | 280/124.103 |
| 2010/0133772 A1* | 6/2010 | Marabese et al. | 280/124.103 |
| 2012/0175856 A1* | 7/2012 | Ellis | 280/124.103 |
| 2012/0181768 A1* | 7/2012 | MacIsaac | 280/124.103 |
| 2012/0267870 A1* | 10/2012 | Mercier | 280/124.103 |
| 2013/0113174 A1* | 5/2013 | Mercier | 280/124.103 |

FOREIGN PATENT DOCUMENTS

| | | |
|---|---|---|
| JP | 2004-122869 A | 4/2004 |
| JP | 2006-248289 A | 9/2006 |
| JP | 2008-168885 A | 7/2008 |

\* cited by examiner

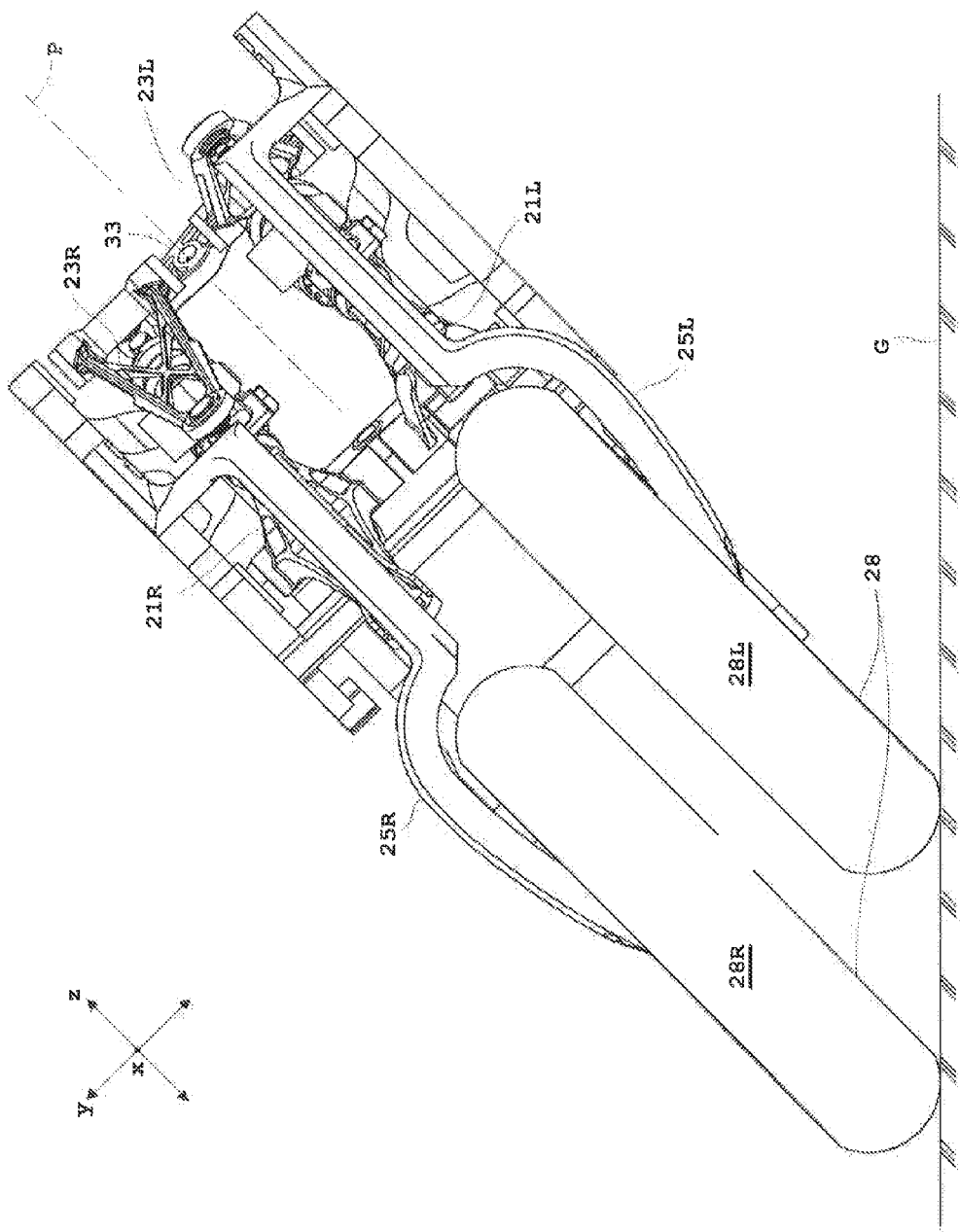

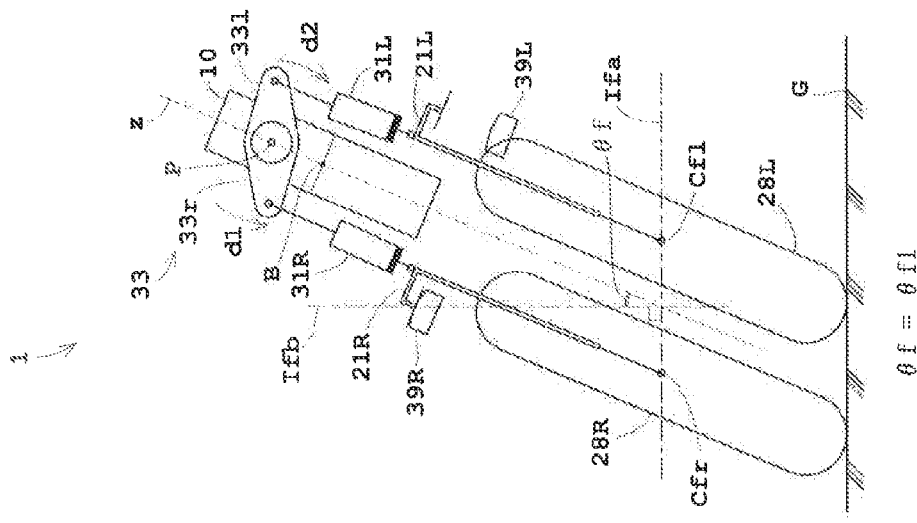
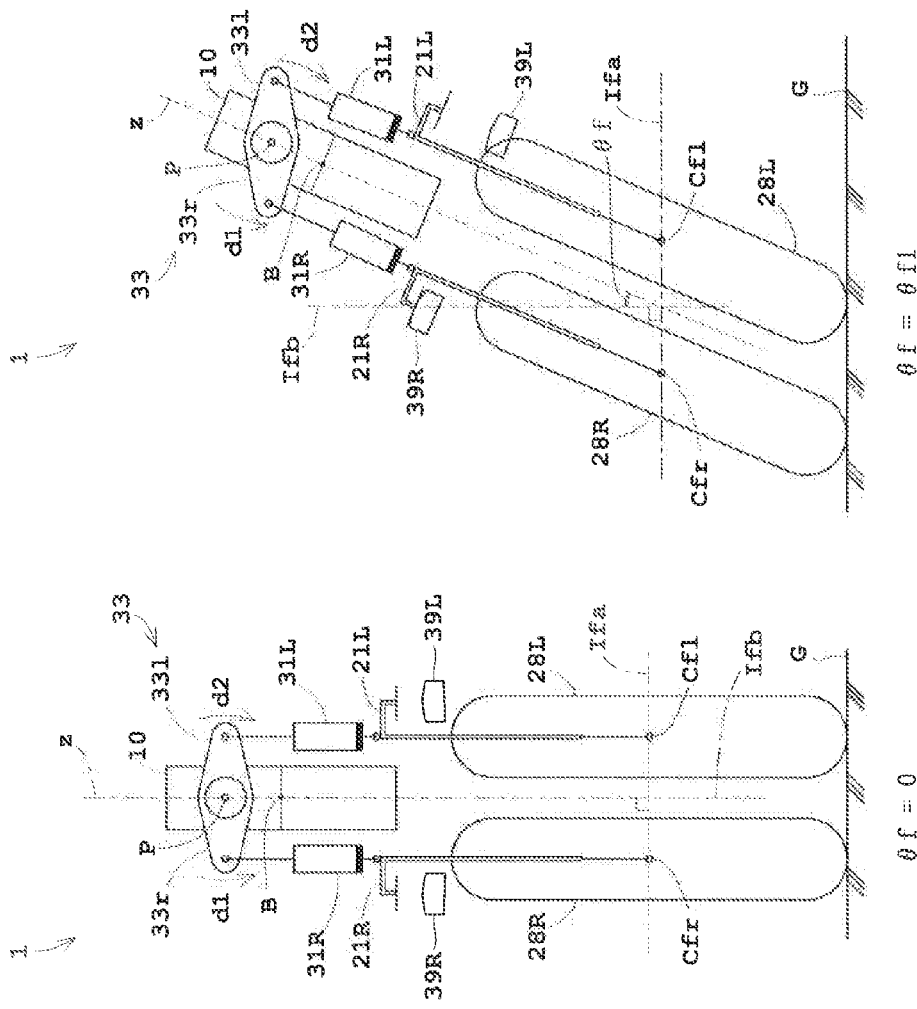
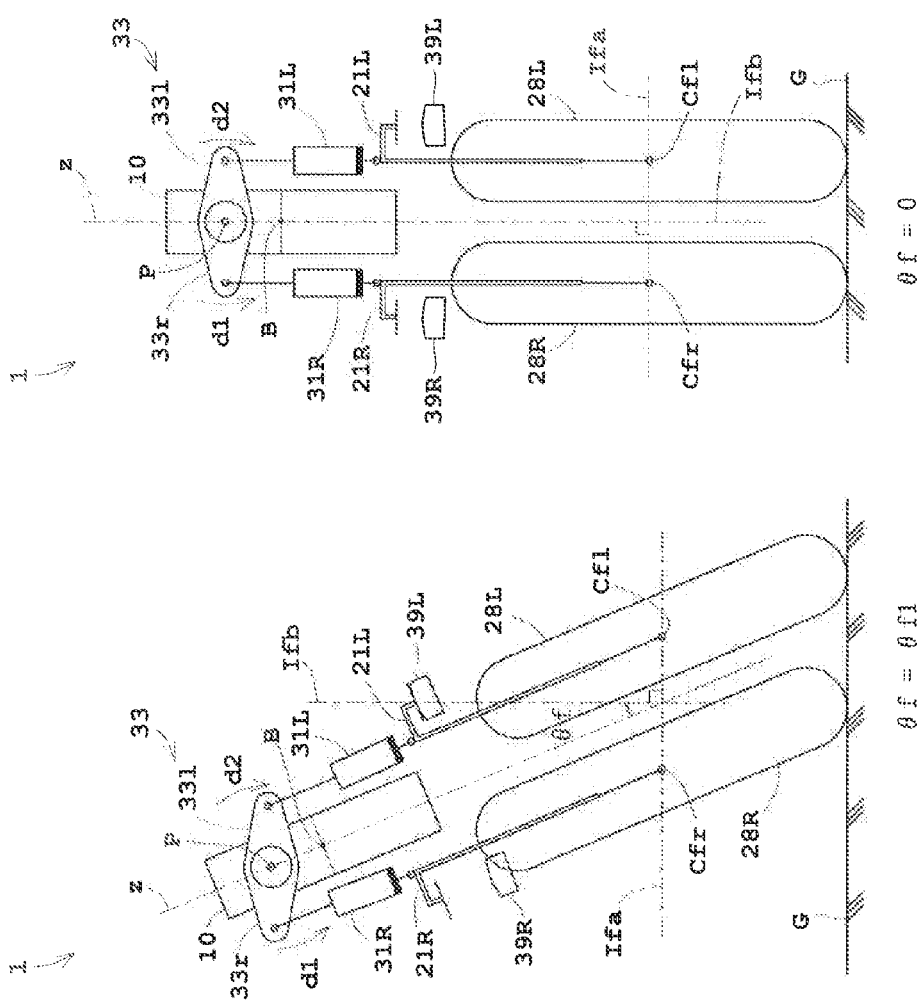

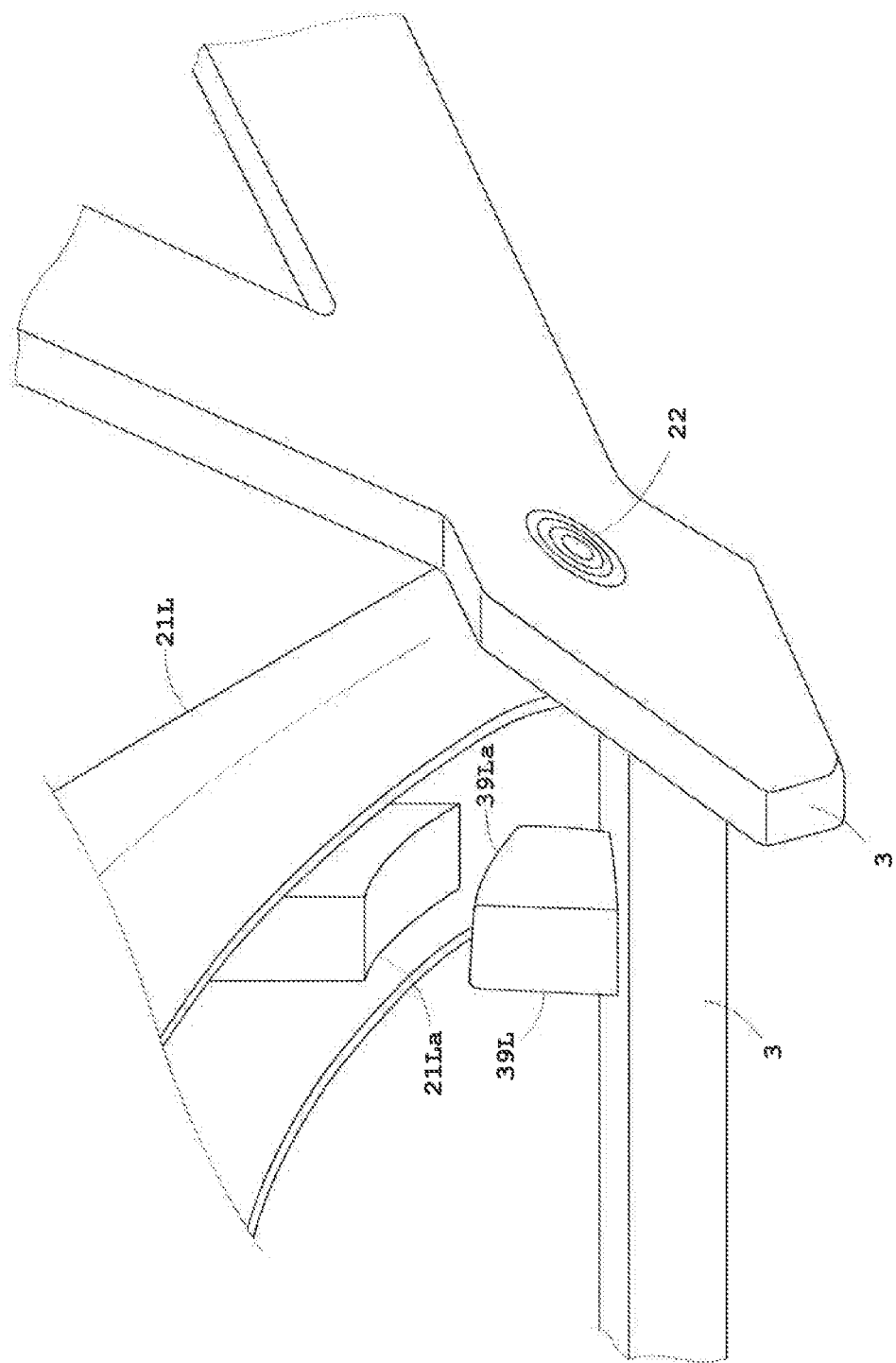

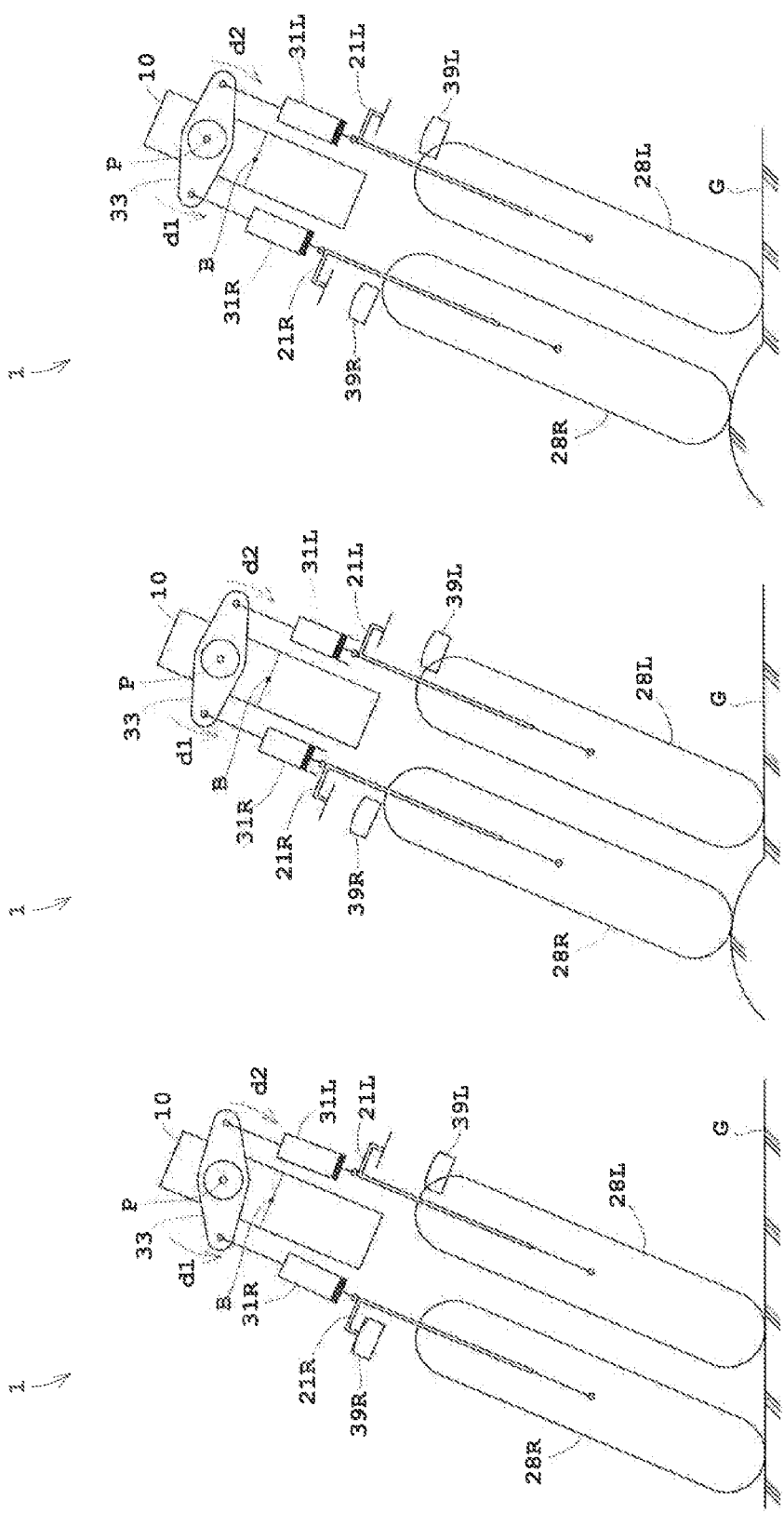

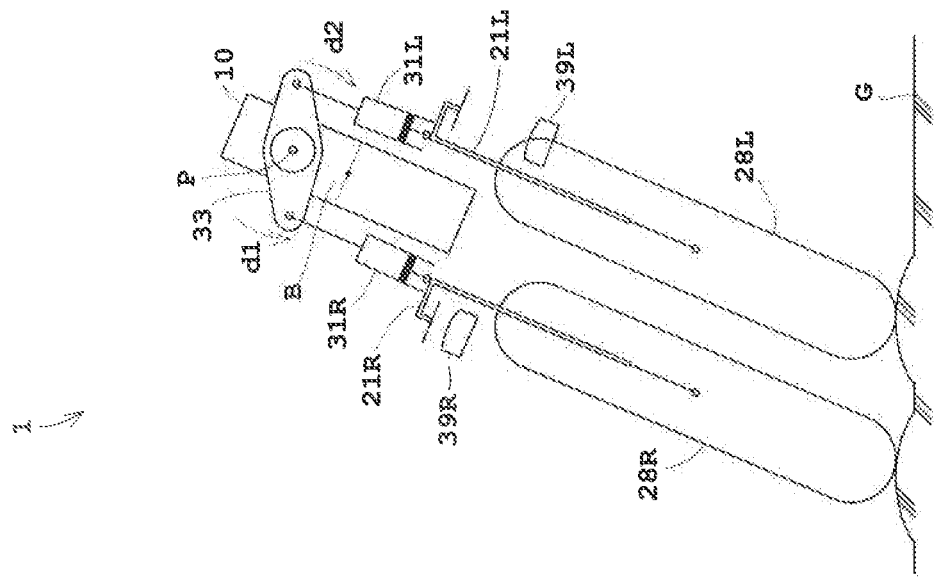
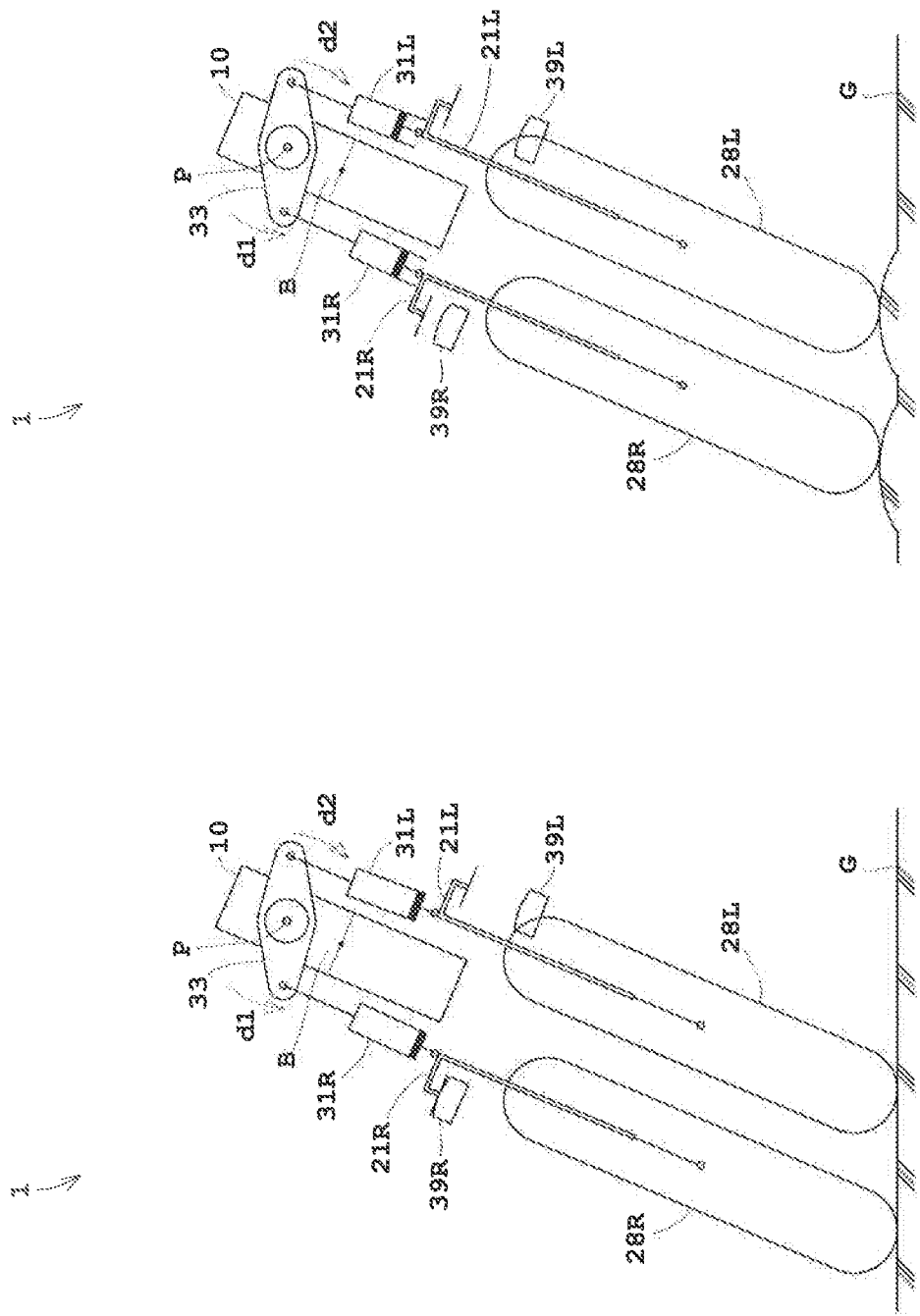

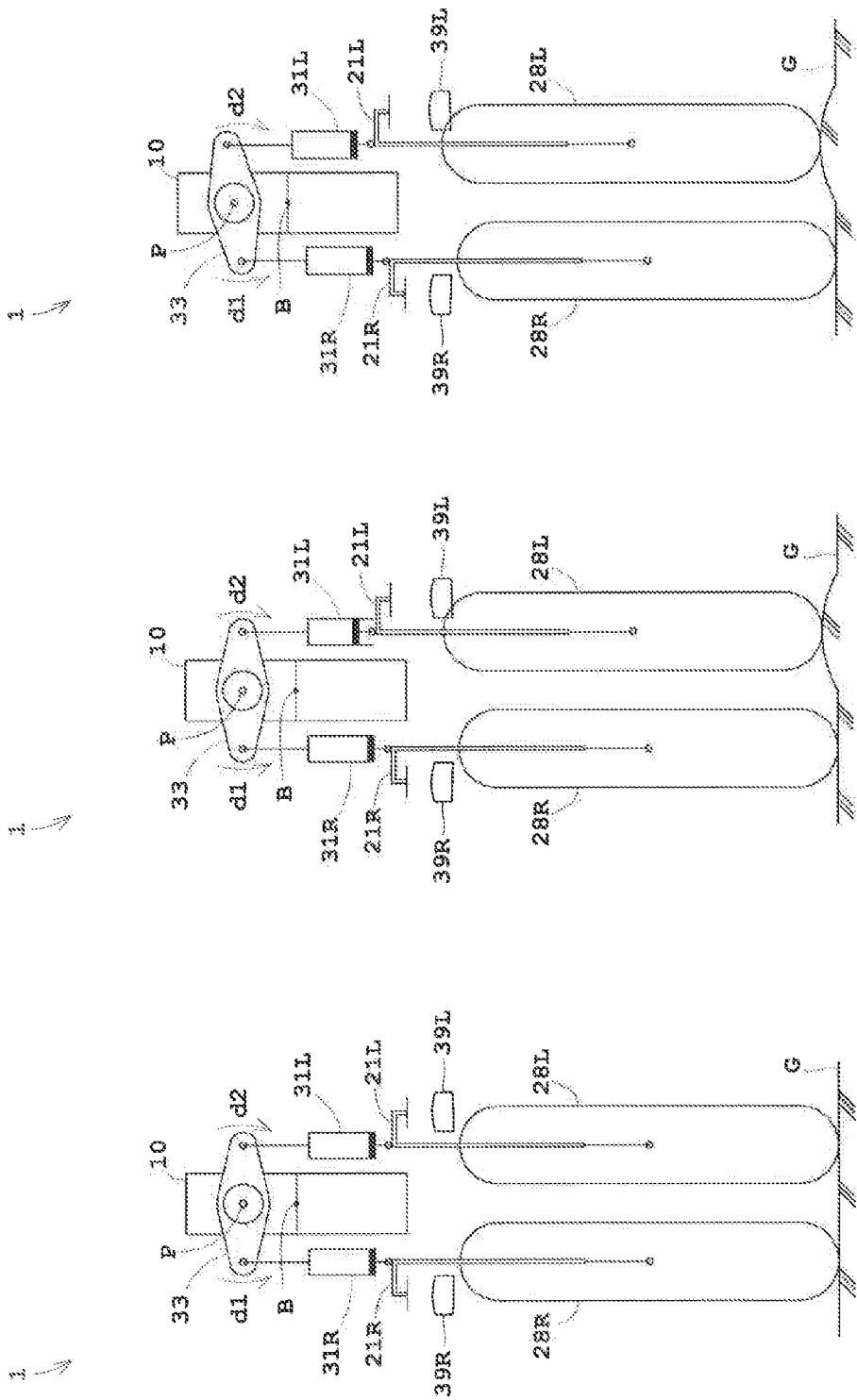

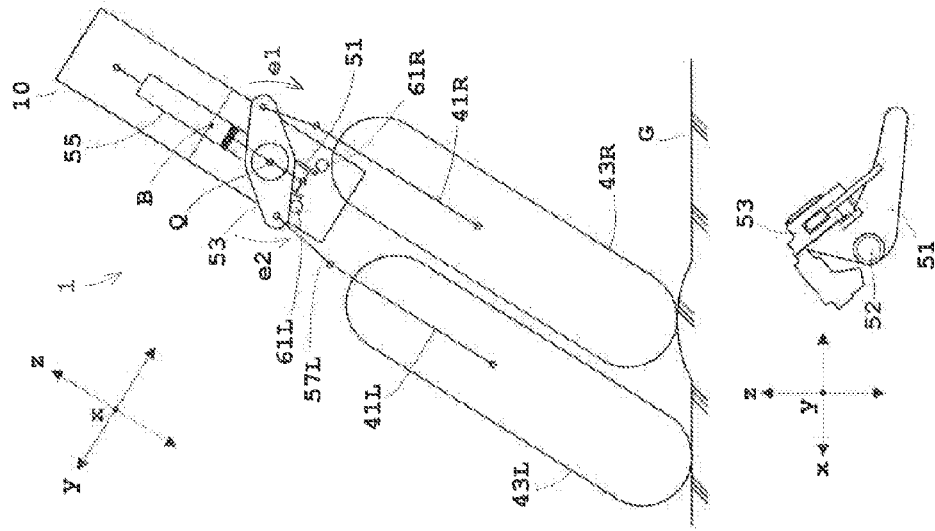
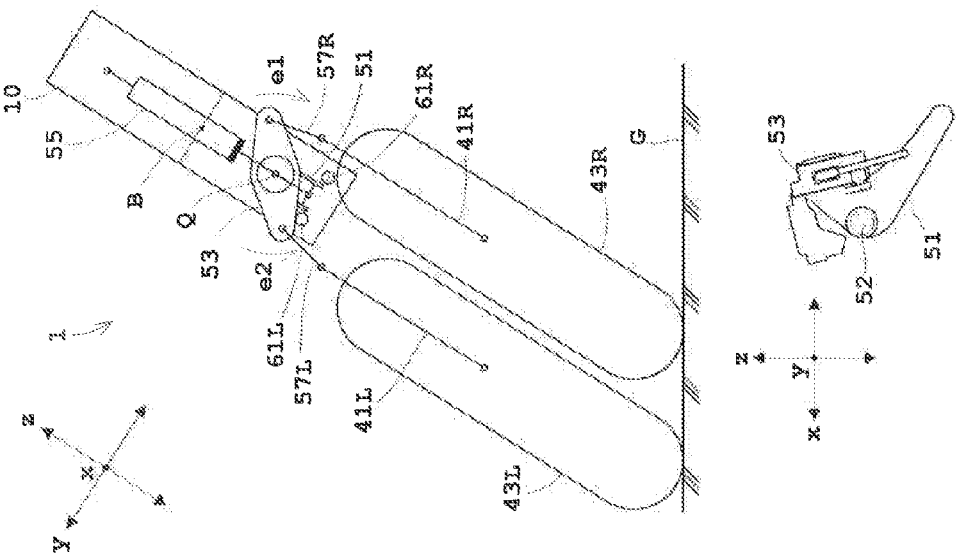

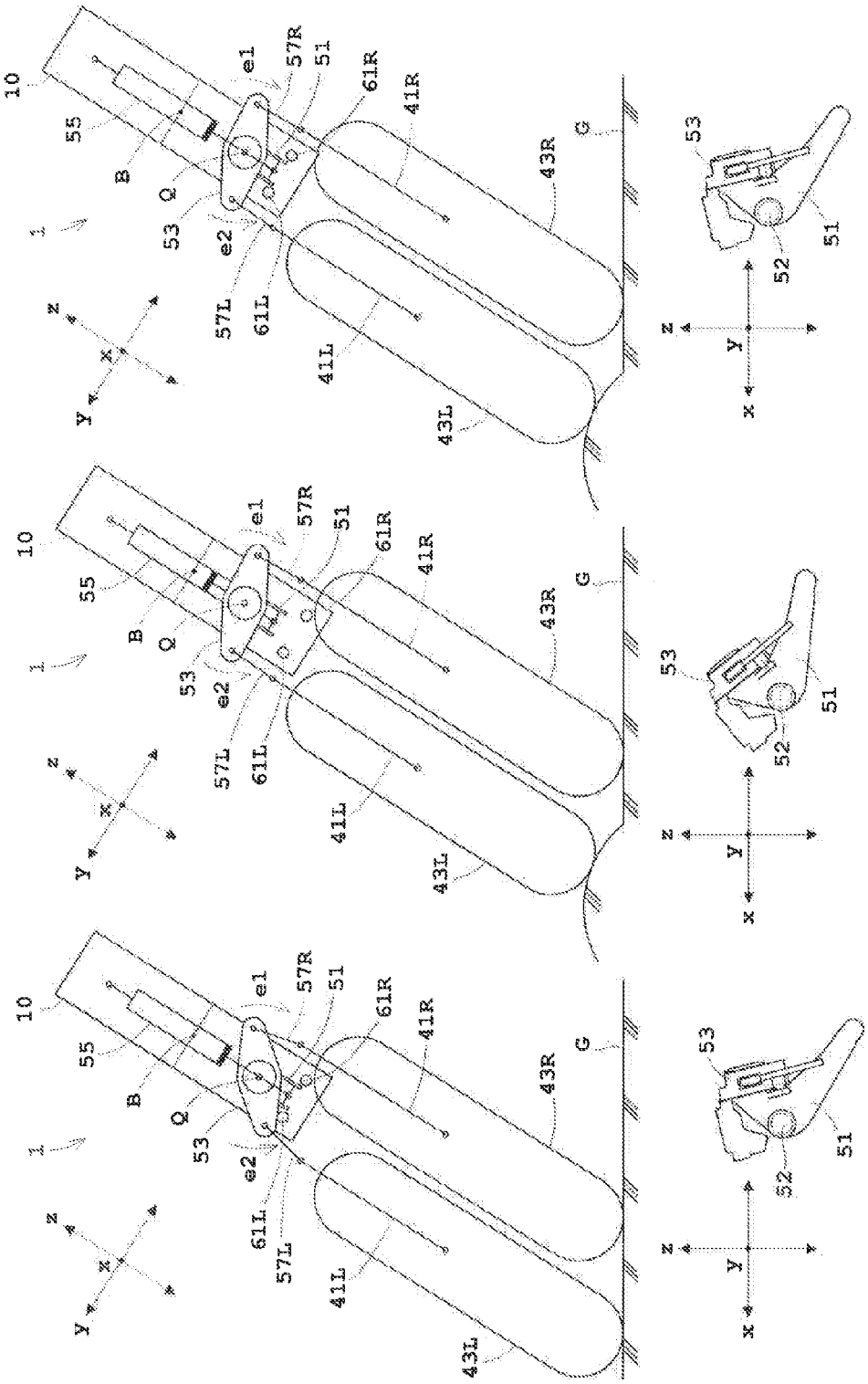

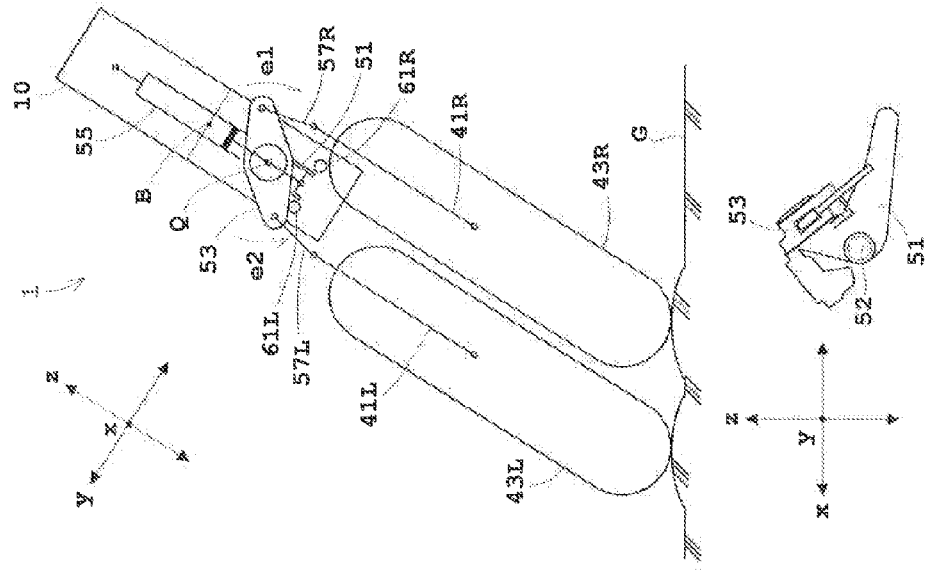
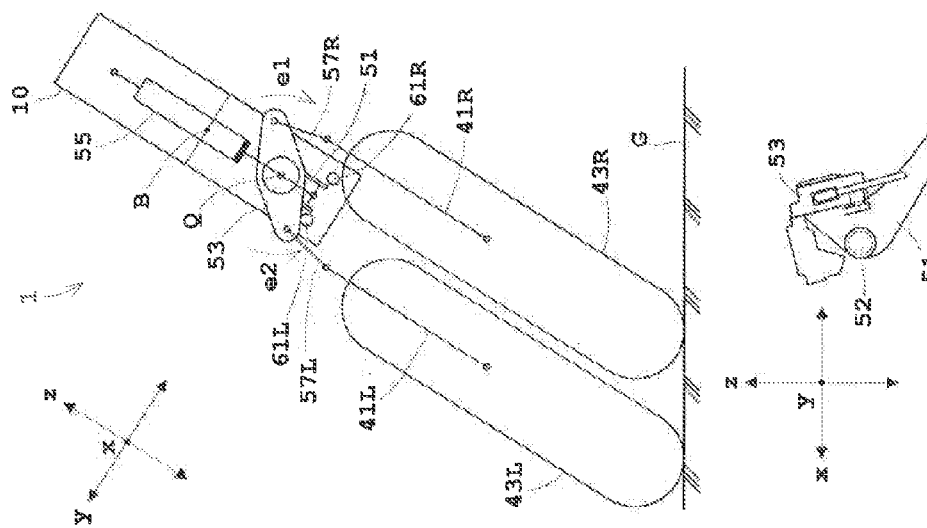

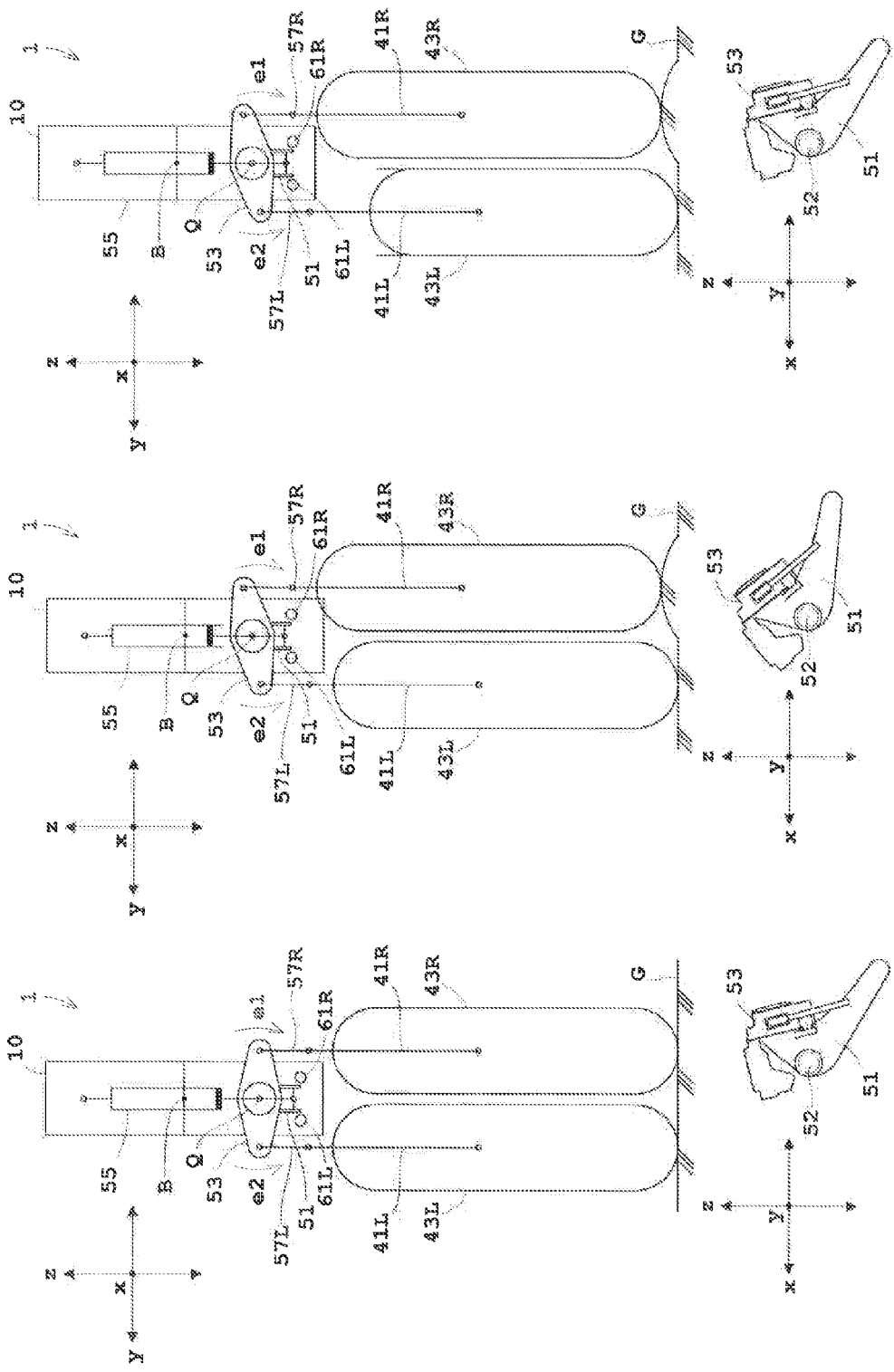

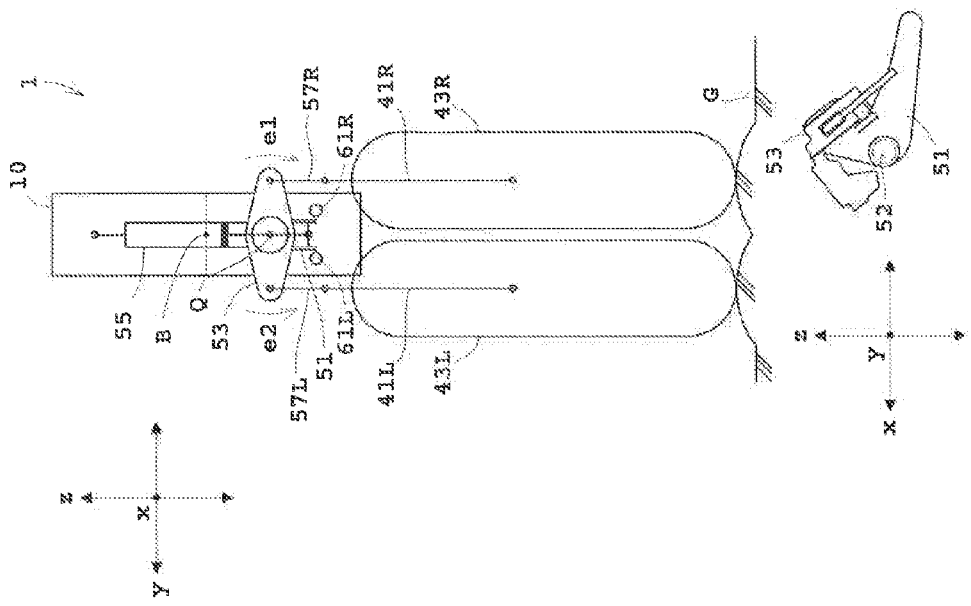
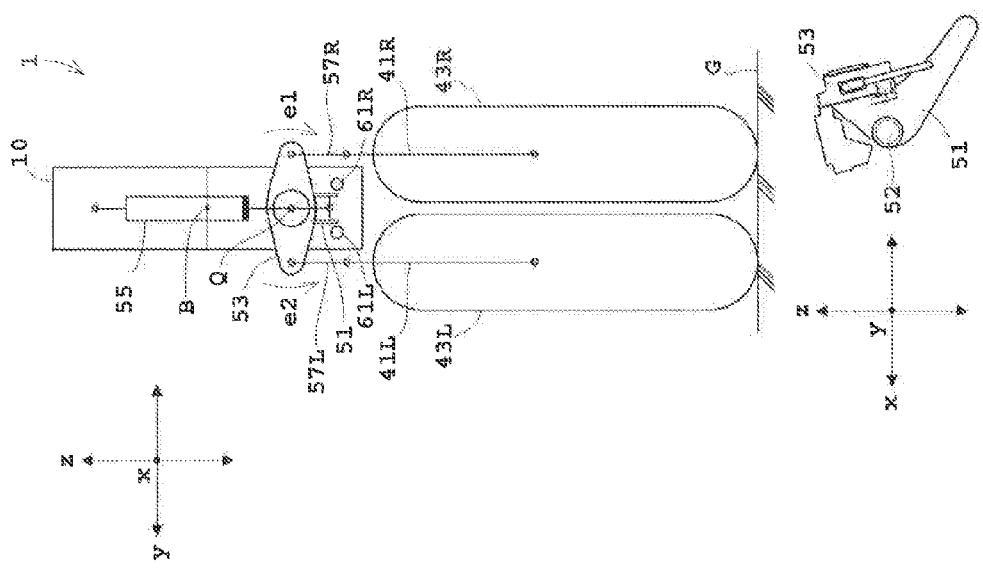

SADDLE RIDING TYPE VEHICLE

BACKGROUND OF THE INVENTION

1. Field of the Invention

The present invention relates to a saddle riding type vehicle such as a three-wheeled automotive vehicle or four-wheeled automotive vehicle, for example, including a right wheel and a left wheel arranged across a vehicle body, and more specifically, to a saddle riding type vehicle which can make turns by leaning the vehicle body.

2. Description of the Related Art

A saddle riding type vehicle has heretofore been proposed that has a pair of wheels located at opposite sides of the vehicle body at the front portion and/or rear portion of the vehicle body, and can make turns by leaning the vehicle body. Further, a saddle riding type vehicle has also been proposed that has a mechanism for restricting leaning of the vehicle body (e.g., Unexamined Japanese Patent Publication No. 2003-341577).

Unexamined Japanese Patent Publication No. 2003-341577 discloses a conventional three-wheeled automotive vehicle having a vehicle body, a single front wheel and a pair of rear wheels. The vehicle body includes a front vehicle body which supports the front wheel, a rear vehicle body which supports the pair of rear wheels, and a Neidhardt mechanism disposed between the front vehicle body and the rear vehicle body. The Neidhardt mechanism connects the front vehicle body and the rear vehicle body to be rotatable relative to each other, while applying an elastic force to the front vehicle body and the rear vehicle body for returning the front and rear vehicle bodies to an upright posture.

The conventional three-wheeled automotive vehicle further includes a swing lock mechanism for restricting the relative rotation of the front vehicle body and the rear vehicle body. The swing lock mechanism is operable through a force generated by a hydraulic disk brake mechanism generated at a time of braking operation. When the rider carries out a braking operation, the front vehicle body and the rear vehicle body become incapable of relative rotation, and the vehicle body will stand unassisted.

However, the conventional example with such construction has the following drawbacks.

In the vehicle described in Unexamined Japanese Patent Publication No. 2003-341577, the vehicle body leans when the front vehicle body and the rear vehicle body rotate relative to each other. Therefore, whenever the vehicle body leans, the force acts on the vehicle body to return it to upright posture. That is, an increase in the lean amount of the vehicle body is inhibited by the Neidhardt mechanism. Thus, the vehicle body cannot freely lean, and so the rider cannot travel comfortably.

When the relative rotation of the front vehicle body and the rear vehicle body becomes impossible, a decrease and an increase in the lean amount of the vehicle body are both prohibited. That is, the vehicle body is caused to be incapable of leaning by the swing lock mechanism every time a braking operation is carried out. When the vehicle body becomes incapable of leaning in this way, the rider cannot travel comfortably.

SUMMARY OF THE INVENTION

In view of the problems above, preferred embodiments of the present invention provide a saddle riding type vehicle which can prevent the vehicle body from leaning excessively while also securing comfortable travel of the vehicle.

A preferred embodiment of the present invention provides a saddle riding type vehicle capable of making turns by leaning a vehicle body and including a right wheel and a left wheel provided at opposite sides of the vehicle body; a suspension mechanism provided on the vehicle body and arranged to support the right wheel and the left wheel such that the right wheel and the left wheel are movable up and down in mutually opposite directions; and a stopper member arranged to contact the suspension mechanism to stop the vehicle body from leaning in excess of a predetermined amount when a lean amount of the vehicle body becomes the predetermined amount.

The saddle riding type vehicle according to a preferred embodiment of the present invention preferably includes the suspension mechanism that supports the right wheel and the left wheel such that they are movable up and down in mutually opposite directions, and therefore the vehicle body can lean with both the right wheel and the left wheel contacting the traveling surface. The stopper member contacts the suspension mechanism when the lean amount of the vehicle body becomes the predetermined amount. Consequently, the stopper member prevents the lean amount of the vehicle body from exceeding the predetermined amount. Therefore, excessive leaning of the vehicle body can be reliably prevented. The stopper member stops only an increase in the lean amount of the vehicle body beyond or in excess of the predetermined amount. That is, even when the stopper member is in contact with the suspension mechanism, the stopper member permits the lean amount of the vehicle body to decrease from the predetermined amount. Thus, even when the stopper member is in contact with the suspension mechanism, the vehicle body does not become incapable of leaning. Therefore, the saddle riding type vehicle according to a preferred embodiment of the present invention enables the rider to travel comfortably.

Here, the "saddle riding type vehicle" may include, for example, besides a vehicle on which the rider can mount in a state of straddling a saddle or seat, a vehicle on which the rider can mount with the legs close together. The "vehicle body" refers to a main frame and components fixed to be integral with the main frame. The "lean amount of the vehicle body" is an angle provided by the relative positional relationship between the right wheel, the left wheel and the vehicle body. Therefore, if plural pairs of right wheels and left wheels are provided, the "lean amount of the vehicle body" is separately provided for each pair. The "lean amount of the vehicle body" always takes on a positive value whether the vehicle body leans to the right or the vehicle body leans to the left.

In the above preferred embodiment of the present invention, it is preferred that the stopper member is separated from the suspension mechanism when the lean amount of the vehicle body is less than the predetermined amount. When the lean amount of the vehicle body is less than the predetermined amount, the stopper member and the suspension mechanism are not in contact (i.e., out of contact). Therefore, when the lean amount of the vehicle body is less than the predetermined amount, the vehicle body can reliably be made able to freely lean. Thus, the rider can travel with increased comfort.

In preferred embodiments of the present invention, it is preferable that the stopper member contacts the suspension mechanism without obstructing a motion of the suspension mechanism to move the right wheel upward relative to the vehicle body and a motion of the suspension mechanism to move the left wheel upward relative to the vehicle body. In other words, the stopper member preferably does not interfere with a motion of the suspension mechanism accompanying an upward movement of the right wheel, and does not interfere with a motion of the suspension mechanism accompanying an upward movement of the left wheel.

Therefore, even when the suspension mechanism is in contact with the stopper member, the right wheel and/or the left wheel is/are preferably movable upward relative to the vehicle body. For example, when the right wheel and/or the left wheel receive(s) a shock from outside, the right wheel and/or the left wheel will move upward relative to the vehicle body. Therefore, the shock received by the right wheel and/or the left wheel from outside is barely transmitted to the vehicle body. In other words, even when the suspension mechanism is in contact with the stopper member, the shock received by the right wheel and/or the left wheel from outside is preferably eased by the suspension mechanism. Therefore, the rider can travel with increased comfort.

In the above preferred embodiments of the present invention, it is preferable that the suspension mechanism includes a right support mechanism swingably provided on the vehicle body and arranged to support the right wheel to be movable up and down; a left support mechanism swingably provided on the vehicle body and arranged to support the left wheel to be movable up and down; and a balancer member arranged to link a swinging of the right support mechanism and a swinging of the left support mechanism, to thereby allow the right wheel and the left wheel to move up and down in mutually opposite directions; the stopper member preferably being arranged in a position deviating from both above the right support mechanism and above the left support mechanism. Since the stopper member is preferably arranged in a position deviating from above the right support mechanism, the stopper member does not stop an upward swinging of the right support mechanism. Since the stopper member is preferably arranged in a position deviating from above the left support mechanism, the stopper member does not stop an upward swinging of the left support mechanism.

In the above preferred embodiments of the present invention, it is preferable that the suspension mechanism includes a buffer arranged to absorb a shock received by at least one of the right wheel and the left wheel from outside even when the suspension mechanism is in contact with the stopper member. When the suspension mechanism is in contact with the stopper member is when the vehicle body leans by the predetermined amount. Therefore, even when the vehicle body leans by the predetermined amount, a shock received by the right wheel and/or the left wheel from outside is preferably absorbed by the buffer, and is barely transmitted to the vehicle body. Therefore, even when the rider is operating in a state in which there is a leaning the vehicle body by the predetermined amount, the rider can travel with increased comfort.

In the above preferred embodiments of the present invention, it is preferable that the suspension mechanism includes a right support mechanism swingably provided on the vehicle body and arranged to support the right wheel to be movable up and down; a left support mechanism swingably provided on the vehicle body and arranged to support the left wheel to be movable up and down; a balancer member arranged to link a swinging of the right support mechanism and a swinging of the left support mechanism, thereby allowing the right wheel and the left wheel to move up and down in mutually opposite directions; and a carrier beam member swingably provided on the vehicle body and arranged to support the balancer member to be rotatable about a rotation axis and movable up and down; the buffer being disposed between the vehicle body and the carrier beam member; the stopper member contacting the suspension mechanism without obstructing an upward movement of the balancer member, an upward swinging of the right support mechanism, and an upward swinging of the left support mechanism.

Since the right support mechanism is swingably provided on the vehicle body, the right wheel can be moved up and down. Similarly, since the left support mechanism is swingably provided on the vehicle body, the left wheel can be moved up and down. The balancer member links a swinging of the right support mechanism and a swinging of the left support mechanism, thereby allowing the right wheel and the left wheel to move up and down in mutually opposite directions. Since the carrier beam member is swingably provided on the vehicle body, the balancer member can be moved up and down. Since the buffer is disposed between the vehicle body and the carrier beam member, the position (swing angle) of the carrier beam member relative to the vehicle body can be maintained constant or substantially constant (in other words, the carrier beam member can be prevented from swinging relative to the vehicle body). The suspension mechanism constructed in this way can conveniently support the right wheel and the left wheel.

When the right wheel and/or the left wheel receive(s) a shock from outside, the shock is transmitted from the right wheel and/or the left wheel to the right support mechanism and/or the left support mechanism, the balancer member, and the carrier beam member. When the shock is transmitted to the carrier beam member, the buffer will contract. With the contraction of the buffer, the carrier beam member swings upward relative to the vehicle body, the balancer member moves upward relative to the vehicle body, and the right support mechanism and/or the left support mechanism swing upward relative to the vehicle body. As a result, the right wheel and/or the left wheel move upward relative to the vehicle body. Thus, the shock received by the right wheel and/or the left wheel from outside is absorbed by the buffer, and is barely transmitted to the vehicle body.

Each motion of the balancer member, the right support mechanism, and the left support mechanism accompanying the above contraction of the buffer is permitted even when the stopper member is in contact with the suspension mechanism. Therefore, even when the suspension mechanism is in contact with the stopper member, the buffer can conveniently absorb the shock received by the right wheel and/or the left wheel.

In the above preferred embodiments of the present invention, it is preferable that the suspension mechanism includes aright support mechanism swingably provided on the vehicle arranged to support the right wheel to be movable up and down; a left support mechanism swingably provided on the vehicle arranged to support the left wheel to be movable up and down; and a balancer member rotatably supported by the vehicle body arranged to link a swinging of the right support mechanism and a swinging of the left support mechanism, thereby allowing the right wheel and the left wheel to move up and down in the mutually opposite directions; and the buffer preferably includes a right buffer disposed between the balancer member and the right support mechanism; and a left buffer disposed between the balancer member and the left support mechanism; the stopper member contacting the suspension mechanism without obstructing an upward swing of the right support mechanism and an upward swing of the left support mechanism.

Since the right support mechanism is swingably provided on the vehicle body, the right wheel can be moved up and down. Since the left support mechanism is swingably provided on the vehicle body, the left wheel can be moved up and down. The right support mechanism is preferably connected to the balancer member through the right buffer. The left support mechanism is preferably connected to the balancer member through the left buffer. The balancer member is rotatably supported by the vehicle body. Therefore, the balancer member links a swinging of the right support mechanism and a swinging of the left support mechanism, thereby enabling the right wheel and the left wheel to move up and down in mutually opposite directions. The suspension mechanism constructed in this way can conveniently support the right wheel and the left wheel.

When the right wheel receives an upward shock from outside, the shock is transmitted to the right buffer through the right support mechanism. The right buffer will contract in response to this shock. With the contraction of the right buffer, the right support mechanism swings upward relative to the vehicle body. As a result, the right wheel moves upward. Thus, the shock received by the right wheel is absorbed by the right buffer, and is barely transmitted to the vehicle body. Similarly, when the left wheel receives an upward shock from outside, the shock is absorbed by the left buffer, and is barely transmitted to the vehicle body.

Here, even when the suspension mechanism is in contact with the stopper member, a swinging of the right support mechanism accompanying the contraction of the right buffer is permitted, and a swinging of the left support mechanism accompanying the contraction of the left buffer is permitted. Therefore, even when the suspension mechanism is in contact with the stopper member, the right buffer and/or the left buffer can preferably absorb conveniently the shock received by the right wheel and/or the left wheel. When the right wheel receives a shock, the left buffer may contribute, or may not contribute, to absorption of the shock. When the left wheel receives a shock, the right buffer may contribute, or may not contribute, to absorption of the shock.

In the above-described preferred embodiment of the present invention, it is preferred that the stopper member contacts the balancer member to restrict a freely rotatable range of the balancer member without obstructing an upward movement of the balancer member. The stopper member does not interfere with the movement of the suspension mechanism accompanying the upward movement of the balancer member. Therefore, even when the suspension mechanism is in contact with the stopper member, the buffer can conveniently absorb shocks.

The freely rotatable range of the balancer member corresponds to the range of the lean amounts where the vehicle body can freely lean right and left. Therefore, the stopper member which is arranged to restrict the freely rotatable range of the balancer member can restrict conveniently the range of the lean amounts where the vehicle body can freely lean.

In the above-described preferred embodiment of the present invention, it is preferred that the stopper member is supported by one of the carrier beam member and the vehicle body.

Where the stopper member is supported by the carrier beam member, the balancer member and the stopper member move together with a swing of the carrier beam member. Thus, even if the carrier beam member swings, the relative positional relationship between the balancer member and the stopper member does not change. Therefore, the freely rotatable range of the balancer member can preferably be maintained constant, and the range of the lean amounts where the vehicle body can freely lean right and left can also preferably be maintained constant. A degree of freedom in arranging the stopper member can be increased.

On the other hand, where the stopper member is supported by the vehicle body, the stopper member can be provided firmly. Therefore, even if a major load is applied to the stopper member, the freely rotatable range of the balancer member can preferably be reliably restricted.

In the above preferred embodiments of the present invention, it is preferable that the stopper member includes a first stopper member arranged to stop the balancer member from rotating in one direction about the rotation axis; and a second stopper member arranged to stop the balancer member from rotating in the other direction about the rotation axis. Since the stopper member preferably includes a first stopper member and a second stopper member, the first stopper member and the second stopper member can be respectively arranged in proper positions. This can preferably reduce an installation space of the stopper member.

In the above-described preferred embodiment of the present invention, it is preferred that the stopper member contacts the right support mechanism to stop the right support mechanism from swinging downward from a predetermined position thereof without obstructing an upward swing of the right support mechanism, and also contacts the left support mechanism to stop the left support mechanism from swinging downward from a predetermined position thereof without obstructing an upward swing of the left support mechanism. The stopper member does not interfere with an upward swing of the right support mechanism, and does not interfere with an upward swing of the left support mechanism. Therefore, even when the suspension mechanism is in contact with the stopper member, the buffer can conveniently absorb the shock received by the right wheel and/or the left wheel.

The "predetermined position thereof", i.e. the predetermined position of the right support mechanism, is preferably a position of the right support mechanism relative to the vehicle body when the lean amount to the left of the vehicle body is the predetermined amount. Similarly, the "predetermined position thereof", i.e. the predetermined position of the left support mechanism, is preferably a position of the left support mechanism relative to the vehicle body when the lean amount to the right of the vehicle body is the predetermined amount.

In the above preferred embodiments of the present invention, it is preferred that the stopper member is disposed below the right support mechanism and below the left support mechanism, respectively. Since the stopper member is disposed below the right support mechanism, the stopper member can conveniently contact the right support mechanism without obstructing an upward swing of the right support mechanism. Similarly, since the stopper member is disposed below the left support mechanism, the stopper member can conveniently contact the left support mechanism without obstructing an upward swing of the left support mechanism.

In the above preferred embodiments of the present invention, it is preferable that the stopper member is supported by the vehicle body. Since the stopper member is supported by the vehicle body, the stopper member can preferably be provided firmly. Therefore, even if a major load is applied to the stopper member, a downward swinging of the right support mechanism can preferably be reliably restricted. Similarly, a downward swinging of the left support mechanism can preferably be reliably restricted.

In the above preferred embodiments of the present invention, it is preferred that the right wheel and the left wheel correspond to a pair of front wheels and a pair of rear wheels; the suspension mechanism being at least one of a suspension mechanism provided to the front wheels which supports the pair of front wheels, and a suspension mechanism provided to rear wheels which supports the pair of rear wheels. In the case of a four-wheeled automotive vehicle including a pair of front wheels and a pair of rear wheels, the suspension mechanism may support the pair of front wheels, may support the pair of rear wheels, or may support both the pair of front wheels and the pair of rear wheels.

Further, examples of additional preferred embodiments of the present invention also include the following saddle riding type vehicles:

(1) A saddle riding type vehicle according to a preferred embodiment of the present invention described above, wherein, when the lean amount of the vehicle body is less than the predetermined amount, the stopper member does not obstruct leaning of the vehicle body.

According to the preferred embodiment of the present invention set out in example (1) above, when the lean amount of the vehicle body is less than the predetermined amount, the stopper member permits the vehicle body to lean to the right and left. In other words, the stopper member restricts the range in which the vehicle body can lean, only to the predetermined amount or less. As a result, the vehicle body can freely lean in the range in which the lean amount of the vehicle body is the predetermined amount or less.

(2) A saddle riding type vehicle according to a preferred embodiment of the present invention described above, wherein, when the lean amount of the vehicle body is less than the predetermined amount, there is a gap between the stopper member and the suspension mechanism.

According to the preferred embodiment of the present invention set out in example (2) above, when the lean amount of the vehicle body is less than the predetermined amount, the stopper member and the suspension mechanism are preferably completely separated. Therefore, the vehicle body is reliably capable of leaning freely.

(3) A saddle riding type vehicle according to a preferred embodiment of the present invention described above, wherein, even when the stopper member is in contact with the suspension mechanism, the suspension mechanism permits the right wheel to move upward relative to the vehicle body when the right wheel has received a shock from a traveling surface, and even when the stopper member is in contact with the suspension mechanism, the suspension mechanism permits the left wheel to move upward relative to the vehicle body when the left wheel has received a shock from a traveling surface.

According to the preferred embodiment of the present invention set out in example (3) above, whether the suspension mechanism is in contact with the stopper member or not, the right wheel can move upward relative to the vehicle body when the right wheel receives a shock from outside. Therefore, the shock received by the right wheel is barely transmitted to the vehicle body. Similarly, whether the suspension mechanism is in contact with the stopper member or not, the left wheel can move upward relative to the vehicle body when the left wheel receives a shock from outside. Therefore, the shock received by the left wheel is barely transmitted to the vehicle body.

(4) A saddle riding type vehicle according to a preferred embodiment of the present invention described above, wherein the stopper member is arranged below the balancer member.

(5) A saddle riding type vehicle according to a preferred embodiment of the present invention described above, wherein the stopper member is disposed above the balancer member.

Each of the preferred embodiments of the present invention set out in examples (4) and (5) above can provide a suspension mechanism having an optimal construction.

(6) A saddle riding type vehicle according to a preferred embodiment of the present invention described above, wherein the balancer member includes arm portions arranged at opposite sides across the rotation axis, and the stopper member contacts the balancer member in positions closer to a central portion of the balancer member supported by the carrier beam member than to distal ends of the arm portions.

The preferred embodiment of the present invention set out in example (6) above can preferably lower the height at which the stopper member projects from the vehicle body or the carrier beam member. In other words, it can shorten a distance of the stopper member jutting out of the vehicle body or the carrier beam member. Therefore, the stopper member can be reduced in size.

(7) A saddle riding type vehicle according to a preferred embodiment of the present invention described above, wherein the stopper member contacts a proximal portion of the right support mechanism connected to the vehicle body, and a proximal portion of the left support mechanism connected to the vehicle body, respectively.

(8) A saddle riding type vehicle according to a preferred embodiment of the present invention described above, wherein the stopper member contacts the right support mechanism at a position closer to a proximal portion of the right support mechanism connected to the vehicle body than to a distal end of the right support mechanism connected to the right wheel, and the stopper member contacts the left support mechanism in a position closer to a proximal portion of the left support mechanism supported by the vehicle body than to a distal end of the left support mechanism supporting the left wheel.

Each of the preferred embodiments of the present invention set out in examples (7) and (8) above preferably can lower the height at which the stopper member projects from the vehicle body. In other words, it can shorten a distance of the stopper member jutting out of the vehicle body. Therefore, the stopper member can be reduced in size.

(9) A saddle riding type vehicle according to a preferred embodiment of the present invention described above, wherein the stopper member is an elastic element.

(10) A saddle riding type vehicle according to a preferred embodiment of the present invention described above, wherein the material of the stopper member is a resin.

According to each of the preferred embodiments of the present invention set out in examples (9) and (10) above, the stopper member can conveniently contact the suspension mechanism.

(11) A saddle riding type vehicle according to a preferred embodiment of the present invention described above, wherein the right wheel and the left wheel are preferably provided for at least one of a front portion of the vehicle body and a rear portion of the vehicle body.

According to the preferred embodiment of the present invention set out in example (11) above, the saddle riding type vehicle may be a three-wheeled automotive vehicle or may be a four-wheeled automotive vehicle.

The saddle riding type vehicle according to various preferred embodiments of the present invention preferably include a suspension mechanism which supports the right wheel and the left wheel to be movable up and down in mutually opposite directions, and therefore the vehicle body can lean with the right wheel and the left wheel contacting the traveling surface. The stopper member preferably prevents the lean amount of the vehicle body from exceeding the predetermined amount by contacting the suspension mechanism when the lean amount of the vehicle body becomes the predetermined amount. Therefore, excessive leaning of the vehicle body can preferably be avoided. The stopper member preferably stops only an increase in the lean amount of the vehicle body from the predetermined amount. Thus, even when the stopper member is in contact with the suspension mechanism, the vehicle body does not become incapable of leaning. Therefore, the saddle riding type vehicle according to preferred embodiments of the present invention enable the rider to travel comfortably.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a front view of the saddle riding type vehicle according to a preferred embodiment of the present invention with the vehicle body leaning.

FIGS. 5A to FIG. 5C are each schematic views of a suspension mechanism provided to front wheels when the saddle riding type vehicle according to a preferred embodiment of the present invention is seen from the front.

FIG. 6 is an enlarged view of a proximal portion of a left lower arm and a left stopper member according to a preferred embodiment of the present invention.

FIGS. 12A to FIG. 12C are schematic views of the suspension mechanism provided to the front wheels when the saddle riding type vehicle according to a preferred embodiment of the present invention with the vehicle body leaning by the predetermined amount is seen from the front.

FIGS. 13A and FIG. 13B are schematic views of the suspension mechanism provided to the front wheels when the saddle riding type vehicle according to a preferred embodiment of the present invention with the vehicle body leaning by the predetermined amount is seen from the front.

FIGS. 14A to FIG. 14C are schematic views of the suspension mechanism provided to the front wheels when the saddle riding type vehicle according to a preferred embodiment of the present invention with the vehicle body standing upright is seen from the front.

FIGS. 16A and FIG. 16B are schematic views of the suspension mechanism provided to the front wheels when the saddle riding type vehicle according to a preferred embodiment of the present invention with the vehicle body leaning by the predetermined amount is seen from the front.

FIGS. 17A to FIG. 17C are schematic views of the suspension mechanism provided to the rear wheels when the saddle riding type vehicle according to a preferred embodiment of the present invention with the vehicle body leaning by the predetermined amount is seen from the back.

FIGS. 18A and FIG. 18B are schematic views of the suspension mechanism provided to the rear wheels when the saddle riding type vehicle according to a preferred embodiment of the present invention with the vehicle body leaning by the predetermined amount to the right is seen from the back.

FIGS. 19A to FIG. 19C are schematic views of the suspension mechanism provided to the rear wheels when the saddle riding type vehicle according to a preferred embodiment of the present invention with the vehicle body standing upright is seen from the back.

FIGS. 20A and FIG. 20B are schematic views of the suspension mechanism provided to the rear wheels when the saddle riding type vehicle according to a preferred embodiment of the present invention is arranged with the vehicle body standing upright is seen from the back.

DETAILED DESCRIPTION OF THE PREFERRED EMBODIMENTS

A saddle riding type vehicle in accordance with preferred embodiments of the present invention will be described hereinafter with reference to the drawings.

Figure 1:
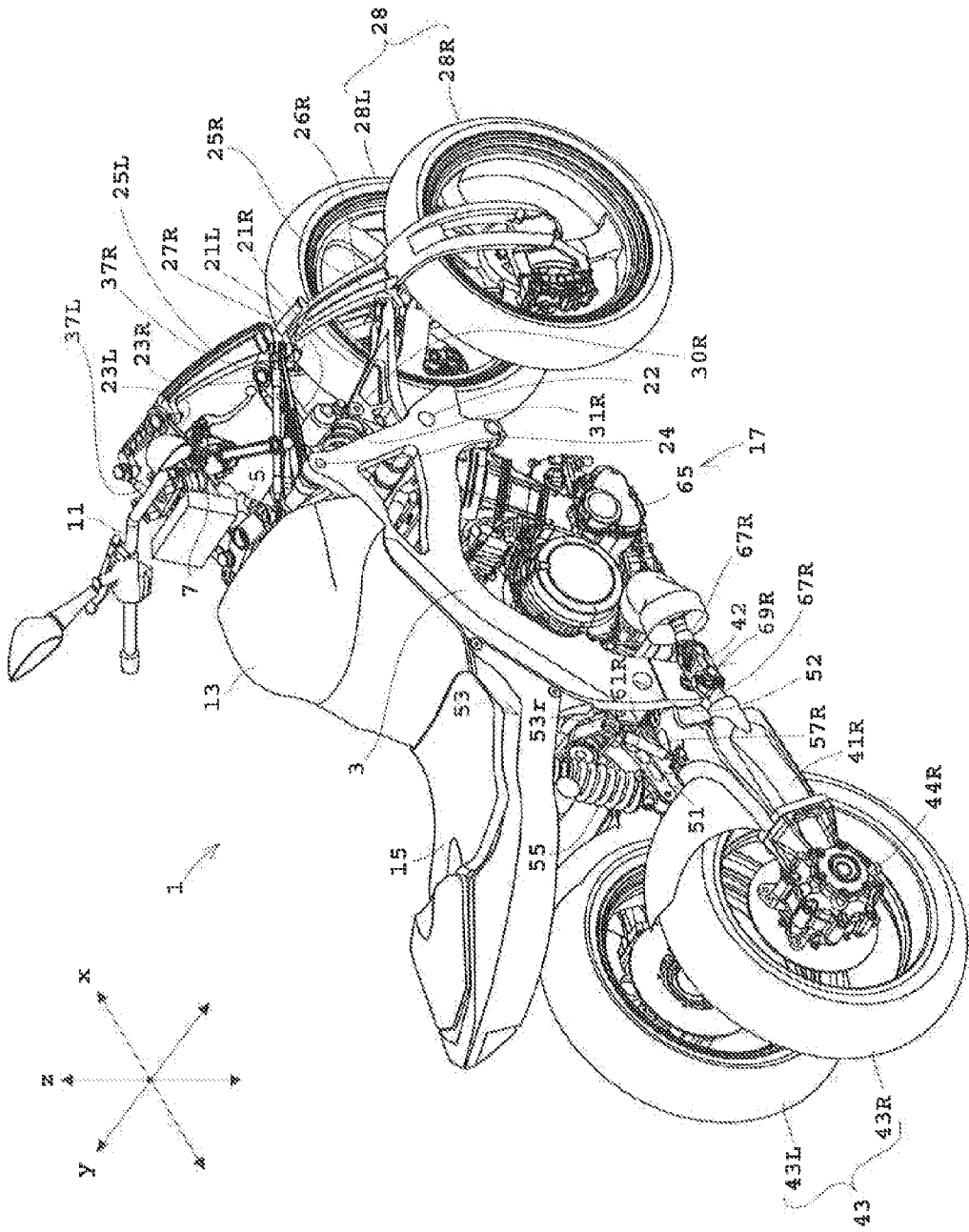
FIG. 1 is a perspective view showing an outline construction of a saddle riding type vehicle according to a preferred embodiment of the present invention.
Figure 2:
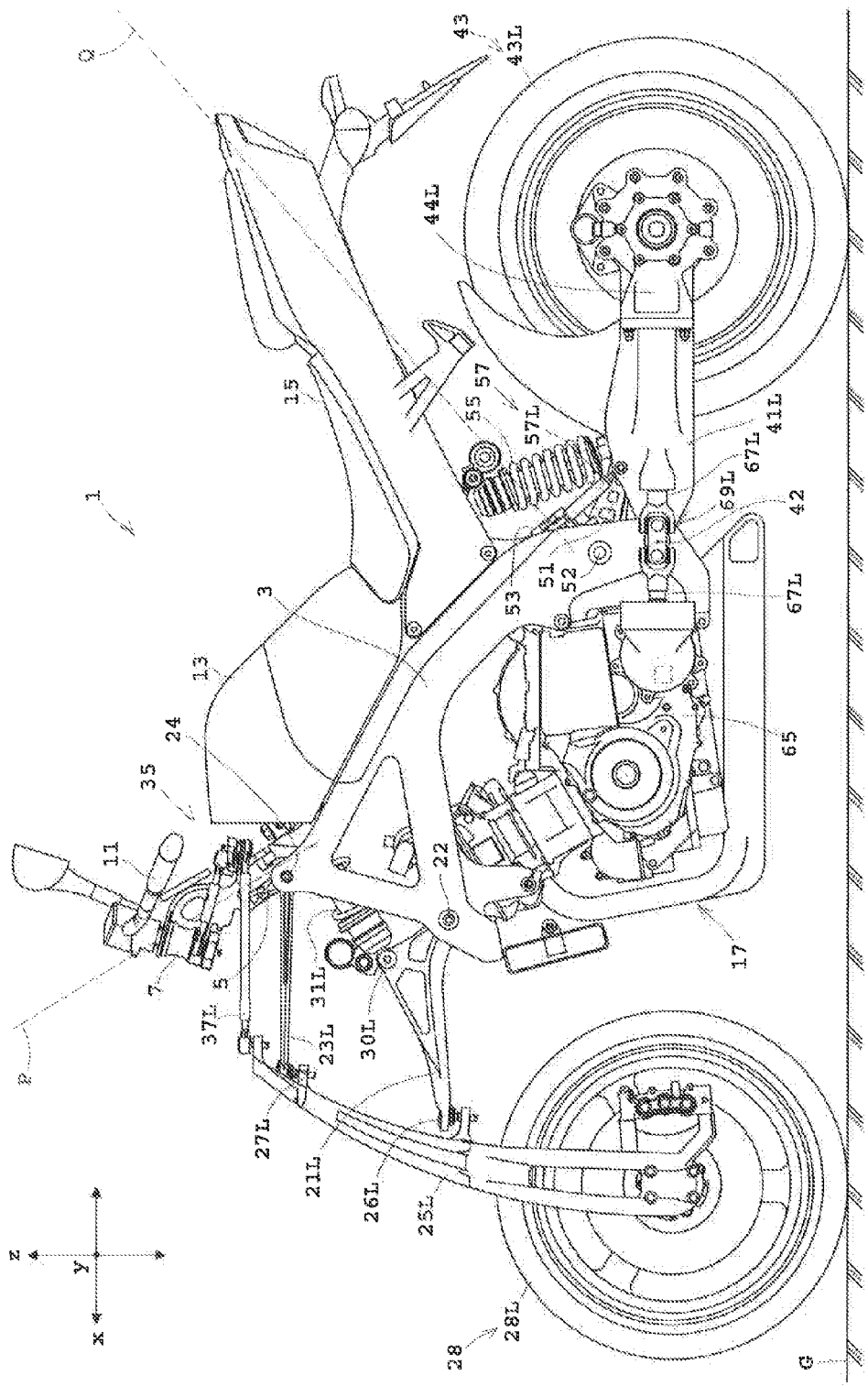
FIG. 2 is a side view showing an outward appearance of the saddle riding type vehicle according to a preferred embodiment of the present invention.
Figure 3:
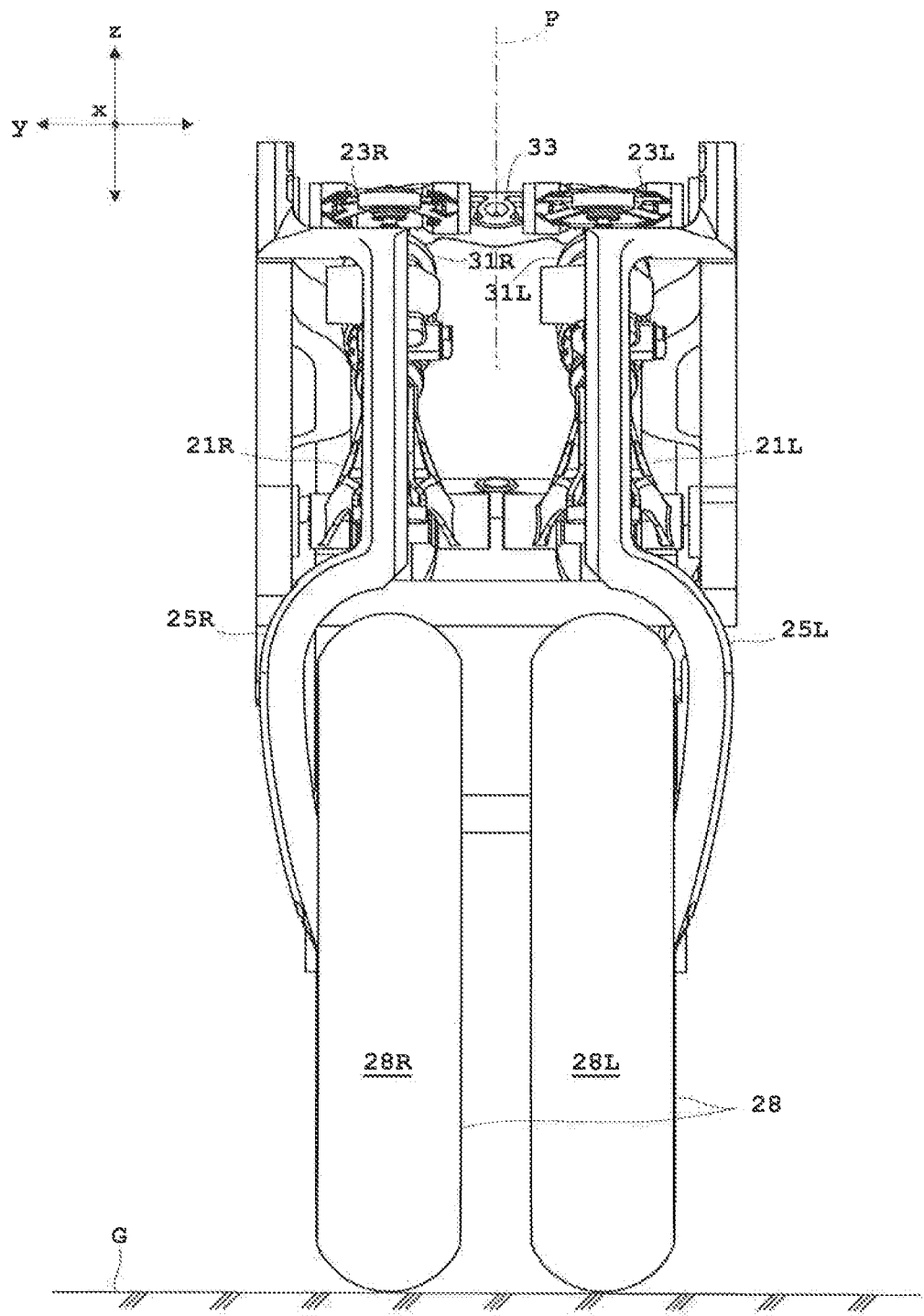
FIG. 3 is a front view of the saddle riding type vehicle according to a preferred embodiment of the present invention with a vehicle body standing upright.

FIG. 1 is a perspective view showing an outline construction of a saddle riding type vehicle according to a preferred embodiment of the present invention. FIG. 2 is a side view showing an outward appearance of the saddle riding type vehicle according to the present preferred embodiment of the present invention. In FIG. 2, the left side of the drawing corresponds to the front of the saddle riding type vehicle, and the right side of the drawing the rear of the saddle riding type vehicle. FIG. 3 is a front view of the saddle riding type vehicle in accordance with a preferred embodiment of the present invention with a vehicle body standing upright. FIG. 4 is a front view of the saddle riding type vehicle in accordance with a preferred embodiment of the present invention with the vehicle body leaning. The handlebar, main frame and so on shown in FIG. 1 and FIG. 2 are omitted from FIG. 3 and FIG. 4.

In FIG. 1 to FIG. 4, an x-direction is the longitudinal direction of a vehicle body, a y-direction is the transverse direction of the vehicle body, and a z-direction is the up-and-down direction of the vehicle body. The longitudinal direction x, transverse direction y and up-and-down direction z of the vehicle body extend perpendicular to one another. In a state of the vehicle body standing upright on a horizontal traveling surface G, the longitudinal direction x and transverse direction y of the vehicle body are horizontal, respectively, and the up-and-down direction z of the vehicle body is vertical. In the following description, the simple indications of "right" and "left" refer to the sides seen from the rider seated on the saddle riding type vehicle 1.

Reference is made to FIG. 1 and FIG. 2. The saddle riding type vehicle 1 in this preferred embodiment of the present invention is preferably a four-wheeled automotive vehicle including a pair of front wheels and a pair of rear wheels. The saddle riding type vehicle 1 includes a main frame 3. The main frame 3 preferably includes a head pipe 7 attached to a forward end thereof through a support frame 5. A handlebar 11 is attached to this head pipe 7. A fuel tank 13 is preferably mounted on an upper portion of the main frame 3. A seat 15 is preferably mounted on an upper portion of the main frame 3 and rearward of the fuel tank 13. An engine 17 is preferably mounted on a lower portion of the main frame 3 and below the fuel tank 13.

In the following description, this main frame 3 and components (e.g. the seat 15) rigidly secured to the main frame 3 will be referred to as the "vehicle body" where appropriate.

The main frame 3 preferably includes, attached to lower front positions thereof, a right lower arm 21R and a left lower arm 21L arranged in the transverse direction y of the vehicle body. One end of the right lower arm 21R is supported by the vehicle body to be swingable about a pivot shaft 22 extending parallel or substantially parallel to the transverse direction y of the vehicle body. One end of the left lower arm 21L also is supported by the vehicle body to be swingable about the pivot shaft 22. The other end of the right lower arm 21R and the other end of the left lower arm 21L extend forward of the vehicle body, respectively. The right lower arm 21R and the left lower arm 21L are preferably swingable independently of each other.

The main frame 3 preferably includes, attached to upper front positions thereof, a right upper arm 23R and a left upper arm 23L arranged in the transverse direction y of the vehicle body. One end of the right upper arm 23R is supported by the vehicle body to be swingable about a pivot shaft 24 extending substantially parallel to the transverse direction y of the vehicle body. One end of the left upper arm 23L also is supported by the vehicle body to be swingable about the pivot shaft 24. The other end of the right upper arm 23R and the other end of the left upper arm 23L extend forward of the vehicle body, respectively. The right upper arm 23R and the left upper arm 23L are preferably swingable independently of each other.

A right knuckle arm 25R is connected to the other end of the right lower arm 21R. The right knuckle arm 25R extends approximately in the up-and-down direction z (more strictly, the right knuckle arm 25R preferably inclines rearward in the longitudinal direction x as it extends upward). The right lower arm 21R is interlocked to a middle position of the right knuckle arm 25R through a ball joint. The other end of the right upper arm 23R is interlocked to an upper position of the right knuckle arm 25R through a ball joint.

As shown in FIG. 1, the positions where the right lower arm 21R and the right upper arm 23R are connected to the right knuckle arm 25R, respectively, are called connecting points 26R and 27R. The right knuckle arm 25R is preferably rotatable relative to the right lower arm 21R and the right upper arm 23R about an axis extending between the connecting points 26R and 27R (hereinafter called simply "vertical axis"). As seen from a side, the pivot shafts 22 and 24 and connecting points 26R and 27R are arranged to correspond or substantially correspond to the vertices of a parallelogram. The right knuckle arm 25R supports a right wheel 28R in a lower position thereof to be rotatable about an axle.

When the right lower arm 21R and the right upper arm 23R swing upward about the pivot shaft 22 and the pivot shaft 24, respectively, the right knuckle arm 25R will move upward. Consequently, the right wheel 28R will move up relative to the vehicle body. Conversely, when the right lower arm 21R and the right upper arm 23R swing downward, respectively, the right knuckle arm 25R will move downward. Consequently, the right wheel 28R will move down relative to the vehicle body.

Similarly, a left knuckle arm 25L is connected to the other end of the left lower arm 21L and the other end of the left upper arm 23L. The left knuckle arm 25L is interlocked to the left lower arm 21L at a connecting point 26L, and is interlocked to the left upper arm 23L at a connecting point 27L. The left knuckle arm 25L supports a left wheel 28L. The left wheel 28L is opposed to the right wheel 28R across the vehicle body. The left wheel 28L moves up and down relative to the vehicle body with swinging of the left lower arm 21L and the left upper arm 23L.

The right wheel 28R and the left wheel 28L are the pair of front wheels noted hereinbefore. In the following description, the right wheel 28R and the left wheel 28L will be referred to collectively as "right and left wheels 28" as appropriate.

Reference is made to FIG. 3 and FIG. 4. A balance beam 33 is preferably rotatably supported by an upper front portion of the main frame 3. A rotation axis P of the balance beam 33 is one axis in a plane including the longitudinal direction x and the up-and-down direction z (in other words, a plane perpendicular or substantially perpendicular to the transverse direction y). In this preferred embodiment, as shown in FIG. 2, the rotation axis P of the balance beam 33 is preferably inclined upward in the up-and-down direction z and forward in the longitudinal direction x. This balance beam 33 is located above the right lower arm 21R and the left lower arm 21L.

As shown in FIG. 1 and FIG. 2, a right shock absorber 31R is preferably provided between the balance beam 33 and the right lower arm 21R. A left shock absorber 31L is preferably provided between the balance beam 33 and the left lower arm 21L. The right shock absorber 31R and the left shock absorber 31L absorb shocks received by the right wheel 28R and/or the left wheel 28L from outside, respectively. When the right shock absorber 31R contracts, the right lower arm 21R will swing upward about the pivot shaft 22. Similarly, when the left shock absorber 31L contracts, the left lower arm 21L will swing upward about the pivot shaft 22.

Reference is made to FIG. 5A to FIG. 5C. FIG. 5A to FIG. 5C are each schematic views of a suspension mechanism provided to the front wheels when the saddle riding type vehicle is seen from the front. FIG. 5A shows the vehicle body leaning a predetermined amount to the right. FIG. 5B shows the vehicle body standing upright. FIG. 5C shows the vehicle body leaning by the predetermined amount to the left. FIG. 5A to FIG. 5C schematically show the vehicle body with sign "10" affixed thereto, and the center of gravity position of the vehicle body 10 with sign "B" affixed thereto. These vehicle body 10 and center of gravity position B are indicated for convenience in order to show clearly how they change between FIG. 5A to FIG. 5C, and are not intended to show positions of the center of gravity position B relative to the members such as the balance beam 33. This applies also to FIG. 9 and FIG. 11 to FIG. 20 to be described hereinafter.

The balance beam 33 preferably includes arm portions 33$r$ and 33$l$ provided at opposite sides across the rotation axis P. One end of the right shock absorber 31R is interlocked to the arm portion 33$r$, arranged on the right side of the rotation axis P (hereinafter referred to as "right arm portion 33$r$"). One end of the left shock absorber 31L is interlocked to the arm portion 331 arranged on the left side of the rotation axis P (hereinafter referred to as "left arm portion 331").

And when, for example, with the vehicle body 10 standing upright as shown in FIG. 5B, the right wheel 28R moves downward relative to the vehicle body 10, the right lower arm 21R will swing downward. The right shock absorber 31R will move downward as pulled by the right lower arm 21R. Consequently, the balance beam 33 rotates in one direction d1 about the rotation axis P. With the rotation of the balance beam 33, the left shock absorber 31L moves upward. The left lower arm 21L swings upward as pulled by the left shock absorber 31L. Consequently, the left wheel 28L moves upward relative to the vehicle body 10. As a result, the vehicle body 10 leans to the left as shown in FIG. 5C. FIG. 4 shows the saddle riding type vehicle 1 with the vehicle body 10 leaning to the left.

Conversely, when, with the vehicle body 10 standing upright, the right wheel 28R moves upward relative to the vehicle body 10, the right lower arm 21R, right shock absorber 31R, balance beam 33, left shock absorber 31L, and left lower arm 21L will preferably move together as an interlocked unit. Consequently, the left wheel 28L will move downward relative to the vehicle body. As a result, the vehicle body 10 leans to the right as shown in FIG. 5A.

The balance beam 33 links swinging of the right lower arm 21R and swinging of the left lower arm 21L to move the right wheel 28R and the left wheel 28L up and down in opposite directions. The amounts of up-and-down motion of the right wheel 28R and the left wheel 28L are preferably equivalent or substantially equivalent amounts.

Here, the phrase "equivalent or substantially equivalent amounts" not only refers to a case where the amounts of up-and-down motion of the right wheel 28R and the left wheel 28L are strictly equal, but also includes a case where the amounts are substantially equal. The amounts being substantially equal may be cases where, for example, a difference occurs between the amounts of up-and-down motion of the right wheel 28R and the left wheel 28L due to play in a connection between components such as the balance beam 33 and the right lower arm 21R, deflection or deformation of each component itself, or surface shapes of the right and left wheels 28 which directly contact the traveling surface G.

The phrase "the vehicle body 10 leans to the right" indicates that the right wheel 28R moves upward relative to the vehicle body 10, and the left wheel 28L moves downward relative to the vehicle body 10 as described above. The phrase "the vehicle body 10 leans to the left" indicates that the right wheel 28R and the left wheel 28L move reversely, respectively. Thus, in this description, the phrase "the vehicle body 10 leans" indicates that the relative positions of the vehicle body 10, right wheel 28R and left wheel 28L change, and not that the angle of the vehicle body 10 changes relative to the traveling surface G.

Moreover, as shown in FIGS. 5A-5C, assuming that an imaginary line perpendicular or substantially perpendicular to an imaginary line Ifa extending through center Cfr of the right wheel 28R and center Cfl of the left wheel 28L is an imaginary vertical line Ifb, a lean amount θf of the vehicle body 10 is an angle formed between the imaginary vertical line Ifb and the up-and-down direction z. Whether the vehicle body 10 is leaning to the right or the vehicle body 10 is leaning to the left, the lean amount θf always takes on a positive value. Therefore, a decrease in the lean amount θf indicates that the lean amount θf of the vehicle body 10 changes to return to upright posture. When the vehicle body 10 stands upright as shown in FIG. 5B, the lean amount θf is zero. Thus, the lean amount θf of the vehicle body 10 is not related to gradients of the traveling surface G or gravity directions, but is a value corresponding to a relative positional relationship between the vehicle body 10 and the right wheel 28R and left wheel 28L.

The right lower arm 21R, right upper arm 23R, and right knuckle arm 25R correspond to the right support mechanism according to a preferred embodiment of the present invention. The left lower arm 21L, left upper arm 23L, and left knuckle arm 25L correspond to the left support mechanism according to a preferred embodiment of the present invention. The balance beam 33 corresponds to the balancer member according to a preferred embodiment of the present invention. The right shock absorber 31R corresponds to the right buffer according to a preferred embodiment of the present invention. The left shock absorber 31L corresponds to the left buffer according to a preferred embodiment of the present invention. The right support mechanism, left support mechanism, balancer member, right buffer, and left buffer define the suspension mechanism provided to the front wheels according to a preferred embodiment of the present invention.

Reference is made to FIG. 1 and FIG. 2. A steering link mechanism 35 is preferably interlocked to a lower position of the handlebar 11 as noted hereinbefore. The steering link mechanism 35 preferably includes a right steering rod 37R and a left steering rod 37L connected thereto. The other end of the right steering rod 37R is interlocked to a position at the upper end of the right knuckle arm 25R and offset from the vertical axis thereof. The other end of the left steering rod 37L is preferably interlocked to a position at the upper end of the left knuckle arm 25L and offset from the vertical axis thereof. The handlebar 11 is operable to rotate the right knuckle arm 25R and the left knuckle arm 25L about the vertical axes, respectively, and provide a steering angle to the right and left wheels 28.

Reference is made to FIG. 6. FIG. 6 is an enlarged view of a proximal portion of the left lower arm and a left stopper member. A left stopper member 39L is preferably provided below the left lower arm 21L.

The left stopper member 39L preferably has approximately the shape of a rectangular parallelepiped. The left stopper member 39L is fixedly supported by the main frame 3, with a lower surface of the left stopper member 39L contacting the main frame 3. An upper surface 39La of the left stopper member 39L is preferably curved. The left lower arm 21L includes a contact portion 21La arranged in a lower portion thereof and capable of making surface contact with the upper surface 39La of the left stopper member 39L. The left stopper member 39L, preferably, is an elastic element, for example. The material of the left stopper member 39L may be a resin such as, for example, rubber.

Assuming that the region of the left lower arm 21L that contacts the left stopper member 39L is a contact region, the contact region, preferably is closer to one end of the left lower arm 21L than to the other end of the left lower arm 21L. One end of the left lower arm 21L is the end of the left lower arm 21L connected to the main frame 3 as noted hereinbefore, and is the region of the left lower arm 21L which corresponds to the vicinity of the pivot shaft 22. This "one end" will hereinafter be called the "proximal portion" as appropriate. The other end of the left lower arm 21L is the end of the left lower arm 21L connected to the left knuckle arm 25L (left wheel 28L) as noted hereinbefore. This "other end" will hereinafter be called the "distal portion" as appropriate. Further, the stopper member 39L, preferably, is arranged to contact the proximal portion of the left lower arm 21L. With this arrangement, the left stopper member 39L can have a reduced height of projection from the main frame 3. In other words, the left stopper member 39L can have a shortened distance in a direction jutting out of the main frame 3. Therefore, the left stopper member 39L can be reduced in size.

As shown in FIG. 5A, the left stopper member 39L is arranged to contact the left lower arm 21L when the lean amount θf to the right of the vehicle body 10 is a predetermined amount θf1. Here, the position (swing angle) of the left lower arm 21L relative to the vehicle body 10 when the lean amount θf to the right of the vehicle body 10 is the predetermined amount θf1 is in particular called "predetermined position". The left stopper member 39L contacts the left lower arm 21L located in the predetermined position, to stop the left lower arm 21L from swinging downward beyond the predetermined position. That is, the left lower arm 21L cannot swing downward from the predetermined position. However, the left lower arm 21L is preferably permitted to separate from the left stopper member 39L. That is, when the left lower arm 21L is in contact with the left stopper member 39L, the left lower arm 21L can swing upward.

On the other hand, as shown in FIG. 5A to FIG. 5C, a right stopper member 39R is arranged below the right lower arm 21R. The right stopper member 39R preferably has the same structure as the left stopper member 39L, and is supported by the main frame 3.

As shown in FIG. 5C, the right stopper member 39R is arranged to contact the right lower arm 21R when the lean amount θf to the left of the vehicle body 10 is the predetermined amount θf1. Here, the position (swing angle) of the right lower arm 21R relative to the vehicle body 10 when the lean amount θf to the left of the vehicle body 10 is the predetermined amount θf1 is in particular called "predetermined position". The right stopper member 39R contacts the right lower arm 21R located in the predetermined position, to stop the right lower arm 21R from swinging downward beyond the predetermined position. However, the right lower arm 21R is permitted to separate from the right stopper member 39R.

The predetermined amount θf1 noted above is preferably set beforehand by taking into account each range of motion of the suspension mechanism provided to the front wheels and the right and left wheels 28, positional relationships of other components of the saddle riding type vehicle 1, and so on. The right stopper member 39R and the left stopper member 39L correspond to the stopper members according to a preferred embodiment of the present invention.

Reference is made to FIG. 1 and FIG. 2. The main frame 3 preferably includes, attached to lower rear positions thereof, a right rear arm 41R and a left rear arm 41L arranged in the transverse direction y of the vehicle body. One end of the right rear arm 41R is preferably supported by the vehicle body 10 to be swingable about a pivot shaft 42 extending in parallel or substantially parallel to the transverse direction y of the vehicle body. One end of the left rear arm 41L is supported by the vehicle body 10 to be swingable about the pivot shaft 42. The other end of the right rear arm 41R and the other end of the left rear arm 41L extend rearward of the vehicle body 10, respectively. The right rear arm 41R and the left rear arm 41L are preferably swingable independently of each other.

A right wheel 43R is preferably rotatably supported by the other end of the right rear arm 41R through a right rear gear case 44R. A left wheel 43L is rotatably supported by the other end of the left rear arm 41L through a left rear gear case 44L. The right wheel 43R and the left wheel 43L are arranged at opposite sides of the vehicle body 10, to have the vehicle body 10 located therebetween.

With the right rear arm 41R swinging up and down about the pivot shaft 42, the right wheel 43R moves up and down relative to the vehicle body 10. Similarly, with the left rear arm 41L swinging up and down about the pivot shaft 42, the left wheel 43L moves up and down relative to the vehicle body 10.

The right wheel 43R and the left wheel 43L are the pair of rear wheels noted hereinbefore. In the following description, the right wheel 43R and the left wheel 43L may be collectively called "right and left wheels 43" as appropriate.

Figure 7:
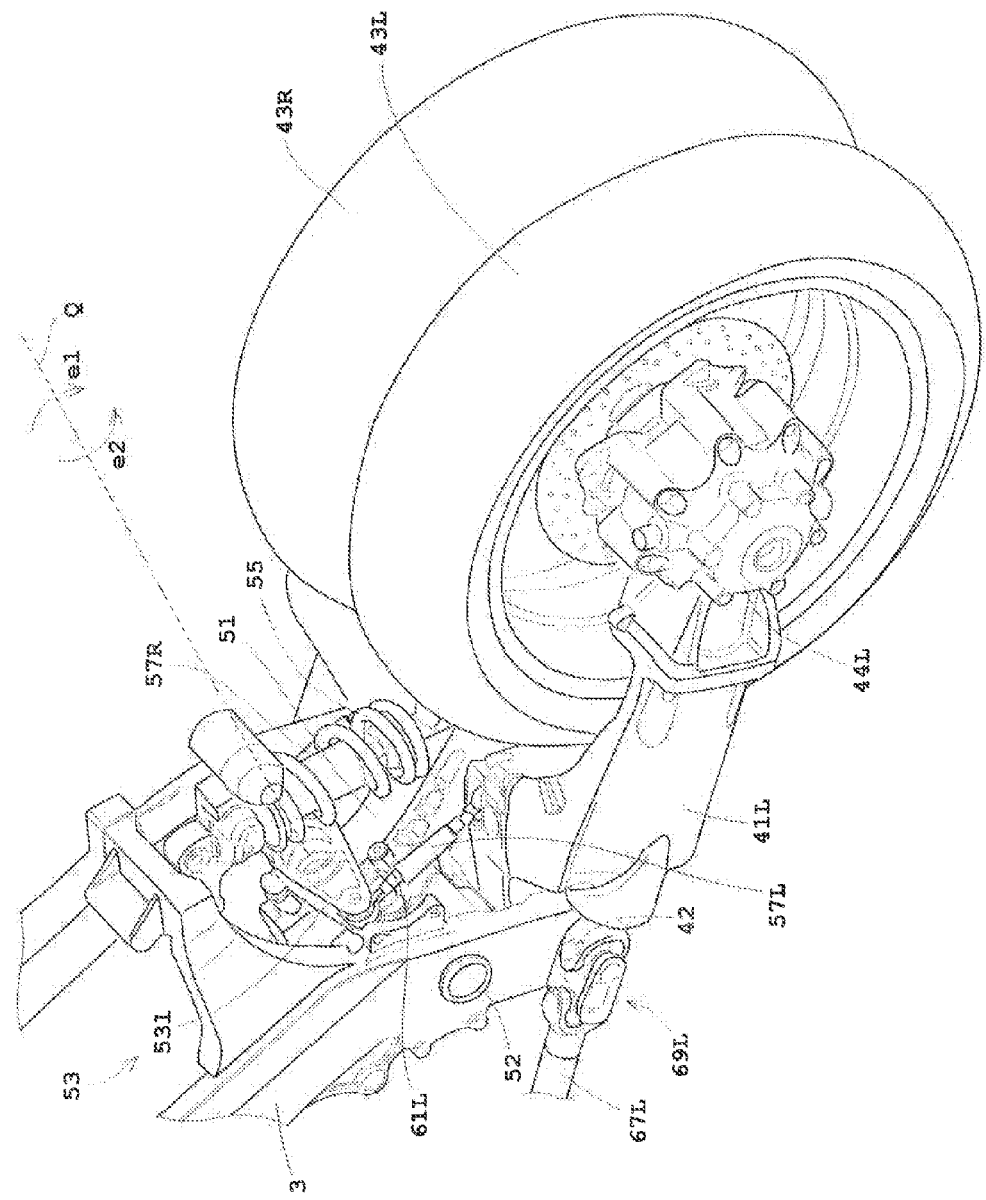
FIG. 7 is a perspective view of a suspension mechanism provided to rear wheels and a stopper member seen from an obliquely rearward position according to a preferred embodiment of the present invention.
Figure 8:
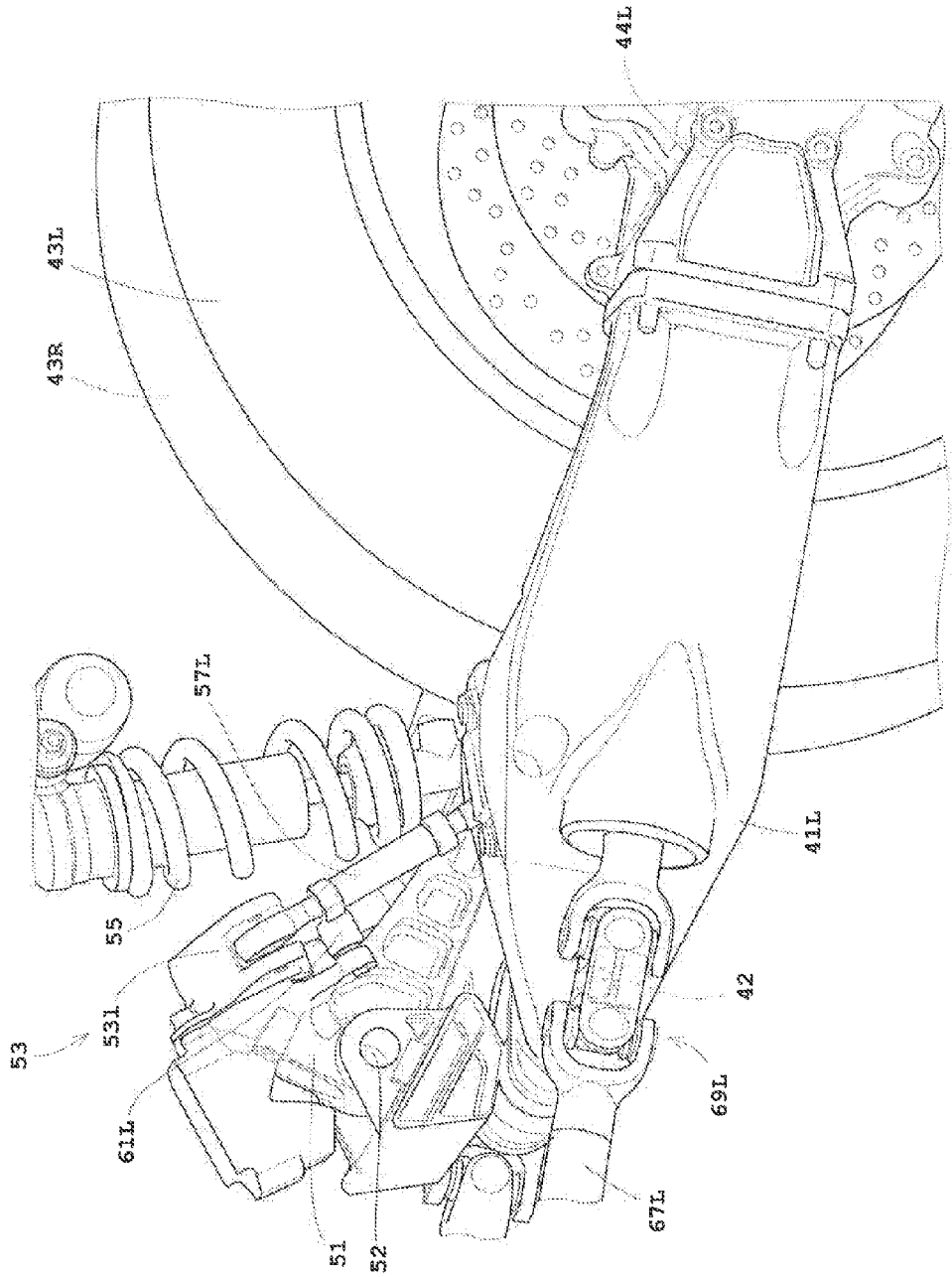
FIG. 8 is a perspective view of the suspension mechanism provided to the rear wheels and the stopper member seen from a side according to a preferred embodiment of the present invention.

Reference is made to FIG. 7 and FIG. 8 along with FIG. 1. FIG. 7 is a perspective view of a suspension mechanism provided to rear wheels and a stopper member seen from an obliquely rearward position. FIG. 8 is a perspective view of the suspension mechanism provided to the rear wheels and the stopper member seen from a side. FIG. 8 omits illustration of the main frame 3.

A carrier beam 51 is preferably arranged in a lower position at the rear end of the main frame 3. The carrier beam 51 is located between the right rear arm 41R and the left rear arm 41L, and in a position higher than the right rear arm 41R and the left rear arm 41L. One end of the carrier beam 51 is supported by the vehicle body 10 to be swingable about a pivot shaft 52. The pivot shaft 52 is parallel or substantially parallel to the transverse direction y of the vehicle body. The pivot shaft 52 is disposed above the pivot shaft 42. The other end of the carrier beam 51 extends rearward of the vehicle body 10.

A shock absorber 55 is preferably provided between the carrier beam 51 and the vehicle body 10. One end of the shock absorber 55 is interlocked to the other end of the carrier beam 51. The other end of the shock absorber 55 is preferably interlocked to an upper portion at the rear end of the main frame 3. In the following description, "the other end of the shock absorber 55" will be called "the upper end of the shock absorber 55" as appropriate. The shock absorber 55 absorbs shocks received by the right wheel 43R and/or the left wheel 43L from outside. The shock absorber 55 preferably keeps the position (swing angle) of the carrier beam 51 relative to the vehicle body substantially constant (in other words, the shock absorber 55 prevents the carrier beam 51 from swinging relative to the vehicle body 10). When the shock absorber 55 contracts, the carrier beam 51 will swing upward about the pivot shaft 52.

A stabilizer 53 is preferably supported by the carrier beam 51 to be rotatable about a rotation axis Q. The rotation axis Q of the stabilizer 53 is one axis in a plane including the longitudinal direction x and the up-and-down direction z (in other words, a plane perpendicular or substantially perpendicular to the transverse direction y). In this preferred embodiment, as shown in FIG. 2, the rotation axis Q of the stabilizer 53 is preferably inclined upward in the up-and-down direction z and rearward in the longitudinal direction x.

The stabilizer 53 includes arm portions 53r, and 53l provided at opposite sides across the rotation axis Q. As shown in FIG. 1, the arm portion 53r, provided on the right side of the rotation axis Q (hereinafter referred to as "right arm portion 53r") is interlocked to the right rear arm 41R through a right rod 57R. As shown in FIGS. 7 and 8, the arm portion 53l provided on the left side of the rotation axis Q (hereinafter referred to as "left arm portion 53l") is interlocked to the left rear arm 41L through a left rod 57L.

Figure 9A:
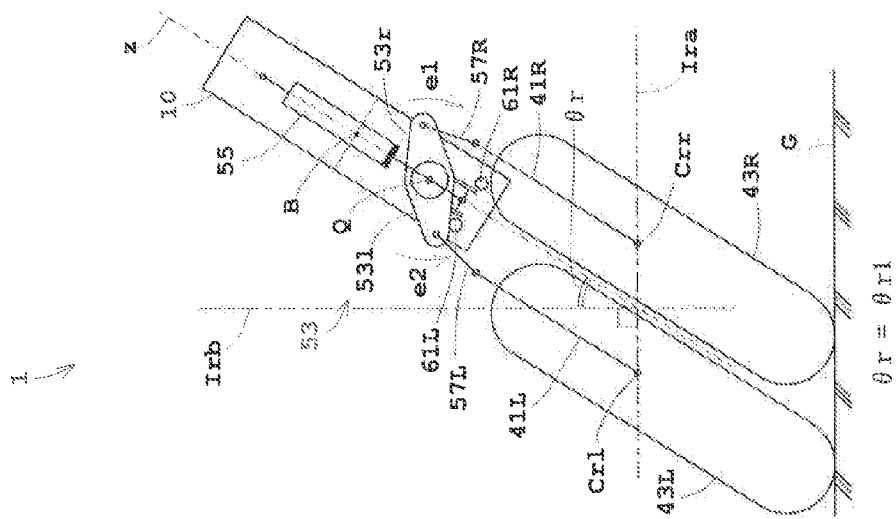
FIGS. 9A to FIG. 9C are each schematic views of the suspension mechanism provided to the rear wheels when the saddle riding type vehicle is seen from the back according to a preferred embodiment of the present invention.
Figure 9B:
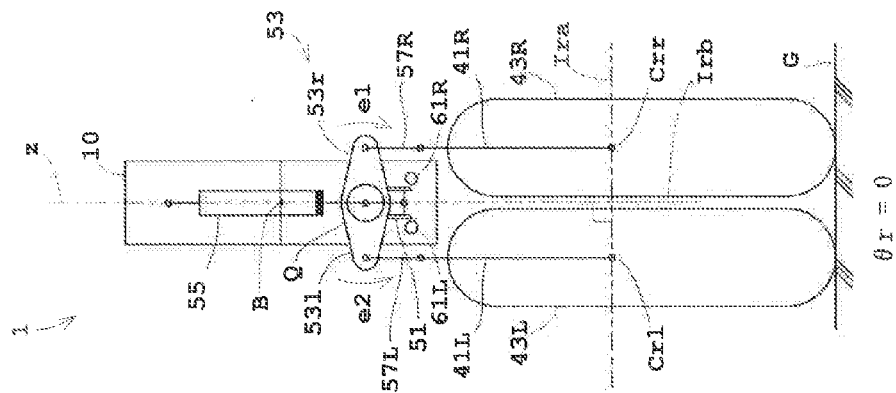
Figure 9C:
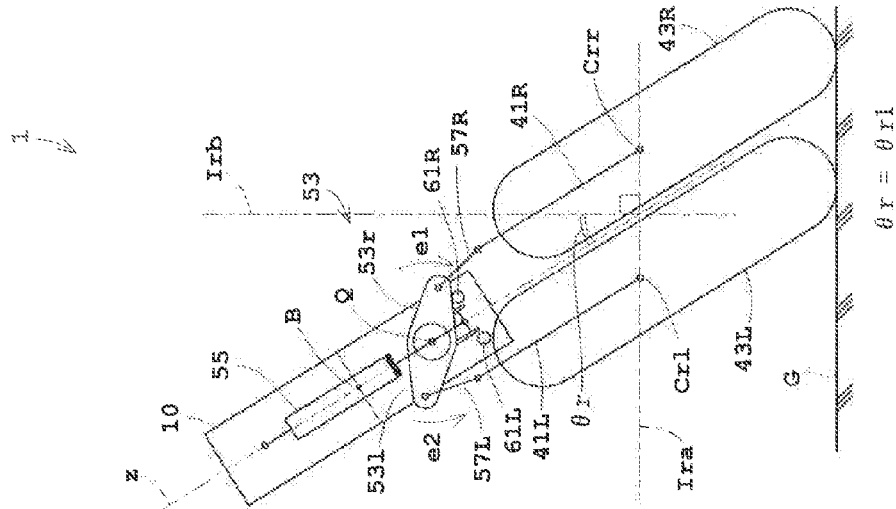

Reference is made to FIG. 9A to FIG. 9C. FIG. 9A to FIG. 9C are each schematic views of the suspension mechanism provided to the rear wheels when the saddle riding type vehicle is seen from the back. FIG. 9A shows the vehicle body 10 leaning by the predetermined amount θr1 to the left. FIG.

9B shows the vehicle body 10 standing upright. FIG. 9C shows the vehicle body 10 leaning by the predetermined amount θr1 to the right.

When, for example, with the vehicle body 10 is standing upright as shown in FIG. 9B, the right wheel 43R moves downward relative to the vehicle body 10, the right rear arm 41R will swing downward about the pivot shaft 42. The right rod 57R will move downward as pulled down by the right rear arm 41R. Consequently, the stabilizer 53 rotates in one direction e1 about the rotation axis Q. With the rotation of the stabilizer 53, the left rod 57L moves upward. The left rear arm 41L swings upward as pulled up by the left rod 57L. The left wheel 43L moves upward relative to the vehicle body 10. As a result, the vehicle body 10 leans to the left as shown in FIG. 9A.

Figure 10A:
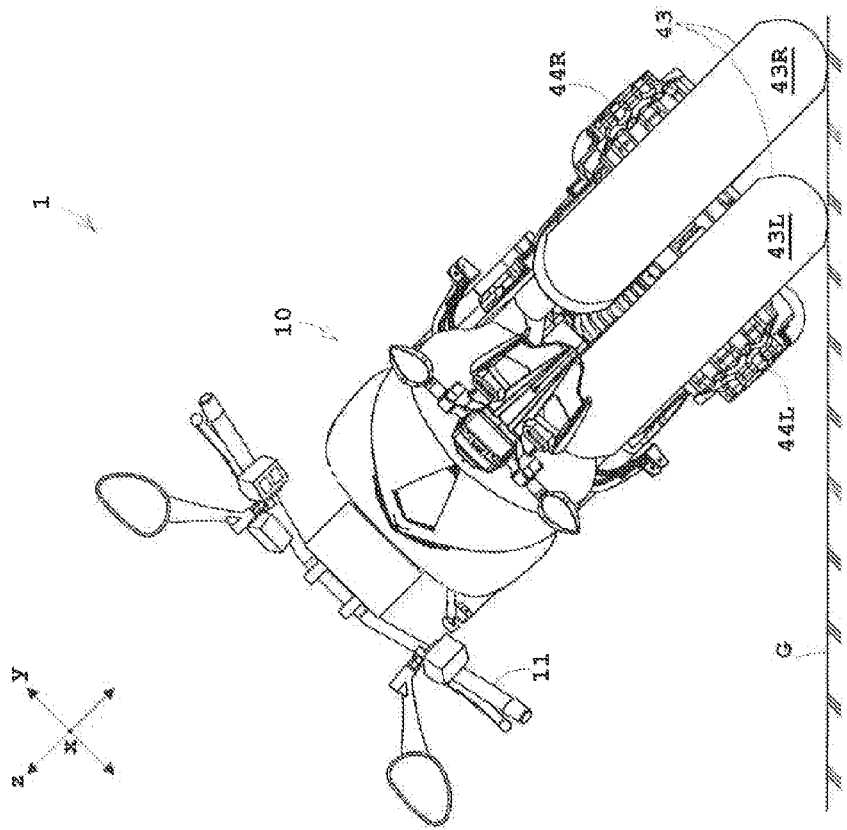
FIG. 10A is a rear view of the saddle riding type vehicle according to a preferred embodiment of the present invention with the vehicle body standing upright.
Figure 10B:
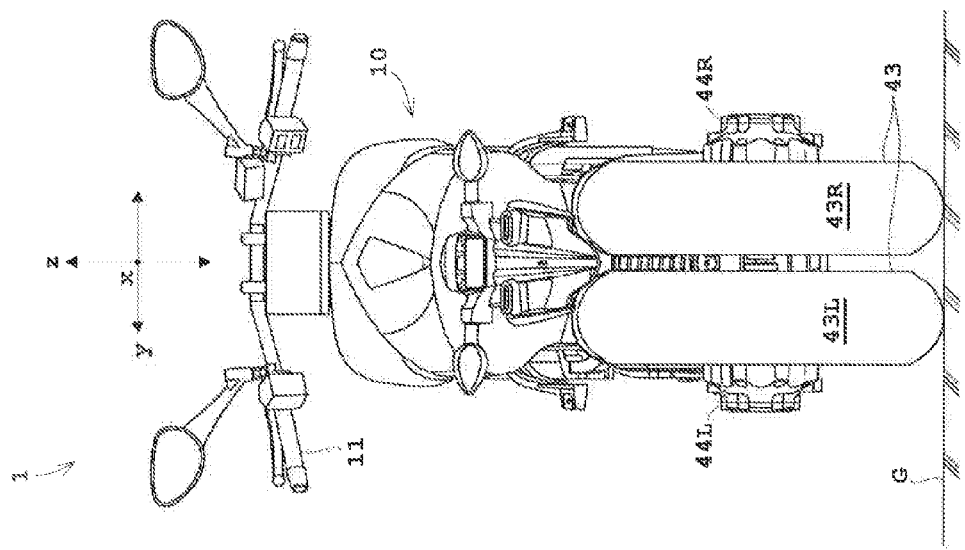
FIG. 10B is a rear view of the saddle riding type vehicle according to a preferred embodiment of the present invention with the vehicle body 10 leaning to the left.

Reference is made to FIGS. 10A and 10B. FIG. 10A is a rear view of the saddle riding type vehicle with the vehicle body 10 standing upright, and FIG. 10B is a rear view of the saddle riding type vehicle with the vehicle body 10 leaning to the left. As shown, when the vehicle body 10 leans to the left, the right wheel 43R moves downward relative to the vehicle body 10, and the left wheel 43L moves upward relative to the vehicle body 10.

Reference is made to FIG. 9A to FIG. 9C again. Conversely, when, with the vehicle body standing upright, the right wheel 43R moves upward relative to the vehicle body 10, the right rear arm 41R, right rod 57R, stabilizer 53, left rod 57L, and left rear arm 41L will move together as an interlocked unit. Consequently, the left wheel 43L moves downward relative to the vehicle body 10. As a result, the vehicle body 10 leans to the right as shown in FIG. 9C.

The stabilizer 53 preferably links swinging of the right rear arm 41R and swinging of the left rear arm 41L to move the right wheel 43R and the left wheel 43L up and down in opposite directions. The amounts of up-and-down motion of the right wheel 43R and the left wheel 43L are equivalent or substantially equivalent amounts. Here, the phrase "equivalent or substantially equivalent amounts" not only refers to the case where the amounts of up-and-down motion of the right wheel 43R and the left wheel 43L are strictly equal, but includes also the case of the amounts being substantially equal.

The phrase "the vehicle body 10 leans to the right" indicates that the right wheel 43R moves upward relative to the vehicle body 10, and the left wheel 43L moves downward relative to the vehicle body 10. The phrase "the vehicle body 10 leans to the left" indicates that the right wheel 43R and the left wheel 43L move reversely, respectively. Thus, in this description, the phrase "the vehicle body 10 leans" indicates that the relative positions of the vehicle body 10, right wheel 43R and left wheel 43L change, and not that the angle of the vehicle body 10 changes relative to the traveling surface G.

Moreover, as shown in FIGS. 9A-9C, assuming that an imaginary line perpendicular or substantially perpendicular to an imaginary line Ira extending through center Crr of the right wheel 43R and center Crl of the left wheel 43L is an imaginary vertical line Irb, lean amount θr of the vehicle body 10 is an angle formed between the imaginary vertical line Irb and the up-and-down direction z. Whether the vehicle body 10 is leaning to the right or the vehicle body 10 is leaning to the left, lean amount θr of the vehicle body 10 is always a positive value. When the vehicle body 10 stands upright as shown in FIG. 9B, lean amount θr of the vehicle body 10 is zero. Thus, lean amount θr of the vehicle body 10 is not related to gradients of the traveling surface G or gravity directions, but is a value corresponding to a relative positional relationship between the vehicle body 10 and the right wheel 43R and left wheel 43L.

Lean amount θr and lean amount θf are angles provided by the same vehicle body 10. However, positions of the traveling surface G where the right and left wheels 28 and 43 contact are different from one another. Conditions of the traveling surface G, such as gradients and ups and downs, vary with positions of the traveling surface G. That is, the conditions of the traveling surface G that the right and left wheels 43 contact are not necessarily the same as the conditions of the traveling surface G that the right and left wheels 28 contact. Therefore, the positional relationship between the vehicle body 10 and the right and left wheels 28 and the positional relationship between the vehicle body 10 and the right and left wheels 43 are not necessarily in agreement. Lean amount θr and lean amount θf are not necessarily in agreement.

The right rear arm 41R corresponds to the right support mechanism according to a preferred embodiment of the present invention. The left rear arm 41L corresponds to the left support mechanism according to a preferred embodiment of the present invention. The stabilizer 53 corresponds to the balancer member according to a preferred embodiment of the present invention. The carrier beam 51 corresponds to the carrier beam member according to a preferred embodiment of the present invention. The shock absorber 55 corresponds to the buffer according to a preferred embodiment of the present invention. The right support mechanism, left support mechanism, balancer member, carrier beam member, and buffer preferably constitute the suspension mechanism provided to the rear wheels according to a preferred embodiment of the present invention.

As shown in FIG. 1, a right stopper member 61R is preferably disposed below the right arm portion 53r, of the stabilizer 53. As shown in FIG. 7 and FIG. 8, a left stopper member 61L is preferably disposed below the left arm portion 53l of the stabilizer 53. Thus, the right stopper member 61R and the left stopper member 61L are separated discrete members each disposed below the stabilizer 53. The right stopper member 61R and left stopper member 61L, compared with a stopper member defined by a single member, can reduce installation space.

As shown in FIG. 1, FIG. 7 and FIG. 8, the right stopper member 61R and the left stopper member 61L preferably have a round rod shape. One end of the right stopper member 61R and one end of the left stopper member 61L are fixedly supported by the carrier beam 51, respectively. A lower surface of the right arm portion 53r, contacts a peripheral surface of the right stopper member 61R. A lower surface of the left arm portion 53l contacts a peripheral surface of the left stopper member 61L.

Assuming that the region of the stabilizer 53 that contacts the right stopper member 61R is a contact region, the contact region, preferably, is a position closer to a central portion of the stabilizer 53 connected to the carrier beam 51 than to a distal end of the right arm portion 53r. The central portion of the stabilizer 53 is a region of the stabilizer 53 corresponding to the vicinity of the rotation axis Q. Similarly, the region of the stabilizer 53 that contacts the left stopper member 61L is preferably positioned closer to the central portion of the stabilizer 53 than a distal end of the left arm portion 53l. Further, the right stopper member 61R and the left stopper member 61L are preferably arranged to contact the central portion of the stabilizer 53, respectively. With this arrangement, the right stopper member 61R and the left stopper member 61L can have a reduced height of projection from the carrier beam 51. In other words, the respective stopper members 61R and 61L can have a shortened distance in a direction jutting out of the carrier beam 51. Therefore, the respective stopper members 61R and 61L can preferably be reduced in size. In FIG. 1, FIG. 7 and FIG. 8, for convenience of illustration, each of the stopper members 61R and 61L is shown to contact the carrier beam 51 in a position close to each distal end of the right arm portion 53r, or left arm portion 53l.

As shown in FIG. 9A, the right stopper member 61R is arranged to contact the stabilizer 53 when the lean amount θr to the left of the vehicle body 10 is the predetermined amount θr1. Here, the position (rotation angle) of the stabilizer 53 relative to the carrier beam 51 when the lean amount θr to the left of the vehicle body 10 is the predetermined amount θr1 is in particular called "predetermined position". The right stopper member 61R stops the stabilizer 53 from rotating in one direction e1 about the rotation axis Q beyond the predetermined position. However, the stabilizer 53 is preferably permitted to separate from the right stopper member 61R. That is, when the stabilizer 53 is in contact with the right stopper member 61R, the stabilizer 53 can rotate in the other direction e2 about the rotation axis Q.

As shown in FIG. 9C, the left stopper member 61L is arranged to contact the stabilizer 53 when the lean amount θr to the right of the vehicle body 10 is the predetermined amount θr1. Here, the position (rotation angle) of the stabilizer 53 relative to the carrier beam 51 when the lean amount θr to the right of the vehicle body 10 is the predetermined amount θr1 is in particular called "predetermined position". The left stopper member 61L contacts the stabilizer 53 located in the predetermined position, and stops the stabilizer 53 from rotating in the other direction e2 about the rotation axis Q beyond the predetermined position. However, the stabilizer 53 is preferably permitted to separate from the left stopper member 61L. That is, when the stabilizer 53 is in contact with the left stopper member 61L, the stabilizer 53 can rotate in the one direction e1 about the rotation axis Q.

As described above, the right stopper member 61R and the left stopper member 61L are arranged to restrict the range in which the stabilizer 53 can freely rotate. The predetermined amount θr1 noted above is preferably set beforehand by taking into account each range of motion of the suspension mechanism provided to the rear wheels and the right and left wheels 43, positional relationships of other components of the saddle riding type vehicle 1, and so on. Pre-determined amount θr1 and predetermined amount θf1 may be equal, but do not need to be equal.

The right stopper member 61R and the left stopper member 61L correspond to the first stopper member and the second stopper member, respectively, according to a preferred embodiment of the present invention.

Reference is made to FIGS. 1 and 2. The engine 17 preferably includes a crankcase 65. The crankcase 65 houses a speed changer as well as a crankshaft (neither being shown). Power generated by the engine 17 is outputted from an output shaft (not shown) of the speed changer extending substantially parallel to the transverse direction y of the vehicle body.

This output shaft is preferably connected to a pair of right and left drive shafts 67R and 67L through bevel gears (not shown). The drive shaft 67R preferably includes a double cardan joint 69R mounted in an intermediate position thereof. The double cardan joint 69R has the center thereof located on an extension of the pivot shaft 42 noted hereinbefore. Consequently, the drive shaft 67R has a flexible axis of rotation.

The drive shaft 67R is rotatably held, in a position rearward of the double cardan joint 69R, by the right rear arm 41R through a bearing (not shown). Consequently, the drive shaft 67R is swingable with the right rear arm 41R about the pivot shaft 42. The rear end of the drive shaft 67R is preferably interlocked to the right wheel 43R through bevel gears (not shown) mounted in the right rear gear case 44R.

The drive shaft 67L is similar in construction to the drive shaft 67R. A double cardan joint 69L also is similar in construction to the double cardan joint 69R.

When the engine 17 generates power, the output shaft transmits the power to the drive shafts 67R and 67L. The drive shafts 67R and 67L rotate about their axes. The drive shaft 67R transmits the power to the right wheel 43R. Consequently, the right wheel 43R rotates about its axle. The drive shaft 67L transmits the power to the left wheel 43L. Consequently, the left wheel 43L rotates about its axle.

Next, examples of operation to lean the vehicle body 10 of the saddle riding type vehicle 1 according to a preferred embodiment of the present invention will be described.

Lean amount θf of the vehicle body 10, as is clear from its definition, is variable with the right and left wheels 28 moving up and down relative to the vehicle body 10. Therefore, operation to lean the vehicle body 10 can be said to be the motion of the suspension mechanism provided to the front wheels which moves the right and left wheels 28 up and down.

On the other hand, lean amount θr of the vehicle body 10, as is clear from its definition, is variable with the right and left wheels 43 moving up and down relative to the vehicle body 10. Therefore, operation to lean the vehicle body 10 can be said to be the motion of the suspension mechanism provided to the rear wheels which moves the right and left wheels 43 up and down. So the motion of the suspension mechanism provided to the front wheels and the motion of the suspension mechanism provided to the rear wheels will be described separately.

First, a case where the lean amount θf of the vehicle body 10 is less than the predetermined amount θf1 will be described. Description will be made here taking for example the case of the vehicle body 10 standing upright as shown in FIG. 5B.

The right lower arm 21R and the left lower arm 21L are separated from (i.e., not in contact with) the right stopper member 39R and the left stopper member 39L, respectively. In other words, when the lean amount θf of the vehicle body 10 is less than the predetermined amount θf1, a gap exists between the right lower arm 21R and the right stopper member 39R, and a gap exists between the left lower arm 21L and the left stopper member 39L. Therefore, the right lower arm 21R and the left lower arm 21L can preferably swing freely in both upward and downward directions. The entire motion of the suspension mechanism provided to the front wheels is not obstructed by the right stopper member 39R or the left stopper member 39L.

When leaning the upright vehicle body 10, the right lower arm 21R and the left lower arm 21L swing as linked together by the balance beam 33. As a result, the right wheel 28R and the left wheel 28L move up and down to in opposite directions. Consequently, the vehicle body 10 leans to the right and left in the state of the right wheel 28R and the left wheel 28L contacting the traveling surface G, as illustrated in FIG. 5A and FIG. 5C. Thus, the vehicle body 10 can freely lean to the right and left.

Next, a case where the lean amount θf of the vehicle body 10 is the predetermined amount θf1 will be described. Description will be made here taking for example the case of the vehicle body 10 leaning by the predetermined amount θf1 to the right as shown in FIG. 5A.

The left lower arm 21L is in contact with the left stopper member 39L. Therefore, the left lower arm 21L is stopped from swinging downward beyond the predetermined position. A further upward swing of the right lower arm 21R is restricted. As a result, the suspension mechanism provided to the front wheels cannot move the right wheel 28R upward, and also cannot move the left wheel 28L downward.

Therefore, the lean amount θf of the vehicle body 10 is stopped from increasing beyond the predetermined amount θf1. That is, the vehicle body 10 cannot lean by more than the predetermined amount θf1 to the right.

However, the left lower arm 21L can freely swing upward. The motion of the entire suspension mechanism provided to the front wheels accompanying an upward swing of the left lower arm 21L is not obstructed by the right stopper member 39R or the left stopper member 39L.

When the left lower arm 21L swings upward, the right lower arm 21R will swing downward. As a result, the right wheel 28R moves downward relative to the vehicle body 10, and the left wheel 28L moves upward relative to the vehicle body 10. Consequently, lean amount θf of the vehicle body 10 decreases in the state of the right wheel 28R and the left wheel 28L contacting the traveling surface G. Thus, even when the lean amount θf of the vehicle body 10 is the predetermined amount θf1, lean amount θf can be decreased freely from the predetermined amount θf1.

The operation taking place when the vehicle body 10 is leaning by the predetermined amount θf1 to the left is preferably the same as in the foregoing description, except that the operating members are reversed from right to left.

As described above, the vehicle body 10 can freely lean right and left when the lean amount θf of the vehicle body 10 is in a range smaller than the predetermined amount θf1. When the lean amount θf of the vehicle body 10 becomes the predetermined amount θf1, either the right stopper member 39R contacts the right lower arm 21R or the left stopper member 39L contacts the left lower arm 21L. Whichever is the case, the vehicle body 10 is prevented from leaning in excess of the predetermined amount θf1. And whichever is the case, the vehicle body 10 can freely lean in a direction to return to upright posture.

First, a case where the lean amount θr of the vehicle body 10 is less than the predetermined amount θr1 will be described. Description will be made here taking for example the case of the vehicle body 10 standing upright as shown in FIG. 9B.

In this state, the stabilizer 53 is separated from the right stopper member 61R and the left stopper member 61L. In other words, when the lean amount θr of the vehicle body 10 is less than the predetermined amount θr1, a gap exists between the stabilizer 53 and the right stopper member 61R, and a gap exists between the stabilizer 53 and the left stopper member 61L. Therefore, the stabilizer 53 can rotate freely in both directions about the rotation axis Q. The entire motion of the suspension mechanism provided to the rear wheels is not obstructed by the right stopper member 61R or the left stopper member 61L.

When leaning the upright vehicle body 10, the right rear arm 41R and the left rear arm 41L swing together as due to their being linked by the stabilizer 53. As a result, the right wheel 43R and the left wheel 43L move up and down in opposite directions. Consequently, the vehicle body 10 leans to the right and left in the state of the right wheel 43R and the left wheel 43L contacting the traveling surface G, as illustrated in FIG. 9A and FIG. 9C. Thus, the vehicle body 10 can freely lean to the right and left.

Next, a case where the lean amount θr of the vehicle body 10 is the predetermined amount θr1 will be described. Description will be made here taking, for example, the case where the lean amount θr of the vehicle body 10 is the predetermined amount θr1 to the right as shown in FIG. 9A.

In this state, the stabilizer 53 is in contact with the left stopper member 61L. Therefore, the stabilizer 53 is stopped from rotating in the other direction e2 about the rotation axis Q. Therefore, a further upward swing of the right rear arm 41R is restricted. A downward swing of the left rear arm 41L beyond the predetermined position is restricted. As a result, the suspension mechanism provided to the rear wheels cannot move the right wheel 43R upward, and cannot move the left wheel 43L downward.

Therefore, lean amount θr of the vehicle body 10 is prevented from becoming larger than the predetermined amount θr1. That is, the vehicle body 10 preferably cannot lean by more than the predetermined amount θr1 to the right.

However, the stabilizer 53 can freely rotate in the one direction e1 about the rotation axis Q. The motion of the entire suspension mechanism provided to the rear wheels which accompanies the rotation of the stabilizer 53 is not obstructed by the right stopper member 61R or the left stopper member 61L.

When the stabilizer 53 rotates in the one direction e1 about the rotation axis Q, the right rear arm 41R will swing downward, and the left rear arm 41L will swing upward. Consequently, lean amount θr of the vehicle body 10 decreases in the state of the right wheel 43R and the left wheel 43L contacting the traveling surface G. Thus, even when the lean amount θr of the vehicle body 10 is the predetermined amount θr1, the lean amount θr can be decreased freely from the predetermined amount θr1.

As described above, the vehicle body 10 can freely lean right and left when the lean amount θr of the vehicle body 10 is in a range smaller than the predetermined amount θr1. When the lean amount θr of the vehicle body 10 becomes the predetermined amount θr1, either the right stopper member 61R or the left stopper member 61L contacts the stabilizer 53. Whichever may contact the stabilizer 53, the vehicle body 10 is prevented from leaning in excess of the predetermined amount θr1. And whichever may contact the stabilizer 53, the vehicle body 10 can freely lean in a direction to return to upright posture.

Next, operations taking place when the right and left wheels 28 receive shocks from outside such as from the traveling surface G. A case of the lean amount θf of the vehicle body 10 being the predetermined amount θf1 and a case of the lean amount θf of the vehicle body 10 being less than the predetermined amount θf1 will be described separately below.

Description will be made taking for example the case where the vehicle body 10 leans by the predetermined amount θf1 to the left. Description will be made by further separating this case into a case where the left wheel 28L receives a shock, a case where the right wheel 28R receives a shock, and a case where both of the right wheel 28R and the left wheel 28L receive shocks.

Figure 11A:
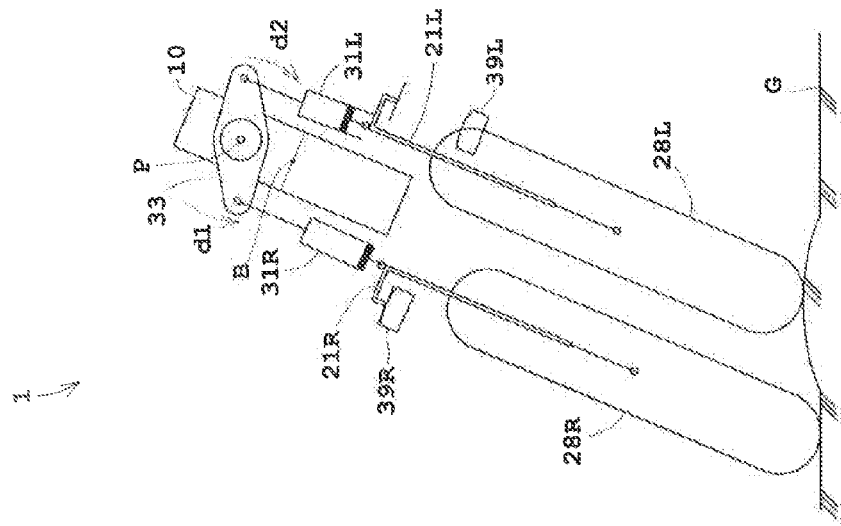
FIGS. 11A and FIG. 11B are schematic views of the suspension mechanism provided to the front wheels when the saddle riding type vehicle according to a preferred embodiment of the present invention with the vehicle body leaning by a predetermined amount is seen from the front.
Figure 11B:
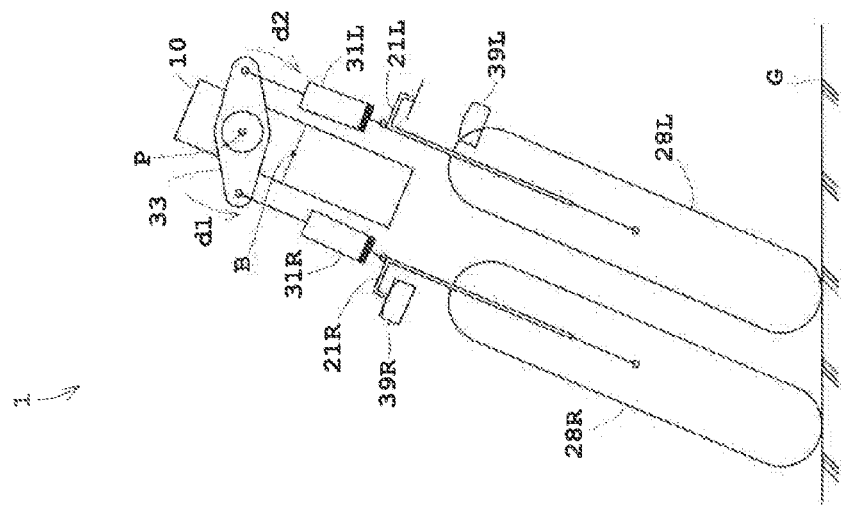

Reference is made to FIG. 11A and FIG. 11B. FIG. 11A and FIG. 11B are schematic views of the suspension mechanism provided to the front wheels when the saddle riding type vehicle with the vehicle body 10 leaning by the predetermined amount θf1 to the left is seen from the front. FIG. 11A shows a state of the saddle riding type vehicle running on a flat traveling surface G, and FIG. 11B shows a state of the left wheel 28L running onto a raised bulge on the traveling surface G.

As shown in FIG. 11A, the right lower arm 21R is in contact with the right stopper member 39R. Consequently, the right lower arm 21R is stopped from swinging downward. An upward swing of the left lower arm 21L is restricted.

When the saddle riding type vehicle 1 is running in such a state, the left wheel 28L runs onto a bulge as shown in FIG. 11B. The left wheel 28L receives an upward shock from the traveling surface G. This shock is transmitted to the left shock absorber 31L through the left lower arm 21L. The balance beam 33 is subjected to a force acting to rotate the balance beam 33 in one direction d1 about the rotation axis P. However, rotation of the balance beam 33 in one direction d1 is restricted by the right stopper member 39R.

At this time, the left shock absorber 31L contracts. With the contraction of the left shock absorber 31L, the left lower arm 21L swings upward and the left wheel 28L moves up relative to the vehicle body 10. Thus, the shock transmitted to the balance beam 33 has decreased compared with the shock received by the left wheel 28L. That is, the shock received by the left wheel 28L is absorbed by the left shock absorber 31L, and is barely transmitted to the vehicle body 10 (main frame 3).

Reference is made to FIG. 12A to FIG. 12C. FIG. 12A to FIG. 12C are schematic views of the suspension mechanism provided to the front wheels when the saddle riding type vehicle with the vehicle body 10 leaning by the predetermined amount θf1 to the left is seen from the front. FIG. 12A shows a state of the saddle riding type vehicle running on a flat traveling surface G, and FIG. 12B and FIG. 12C show a state of the right wheel 28R running onto a raised bulge on the traveling surface G.

Assume that the saddle riding type vehicle 1 is running with the vehicle body 10 leaning by the predetermined amount θf1 to the left as shown in FIG. 12A. When the right wheel 28R runs onto a bulge at this time as shown in FIG. 12B, the right wheel 28R will receive an upward shock. This shock is transmitted to the right shock absorber 31R through the right lower arm 21R. The balance beam 33 is subjected to a force acting to rotate the balance beam 33 in the other direction d2 about the rotation axis P.

At this time, rotation of the balance beam 33 in the other direction d2 about the rotation axis P is not restricted by the right stopper member 39R. However, when the balance beam 33 rotates in the other direction d2, the balance beam 33 will receive a reaction force from the left shock absorber 31L, left lower arm 21L, left wheel 28L, and traveling surface G.

When conditions such undulations of the traveling surface G change, naturally the vehicle body 10 will also move up and down. However, since a force of inertia is acting on the vehicle body 10, up-and-down motion of the vehicle body 10 takes place after the change in the conditions of the traveling surface G. In other words, when the right wheel 28R runs onto a bulge, the vehicle body 10 and the balance beam 33 will not move up immediately. FIG. 12B shows that, although the right wheel 28R runs onto the bulge, the height of the center of gravity position B of the vehicle body 10 is still the same as the height of the center of gravity position B of the vehicle body 10 shown in FIG. 12A. In other words, up-and-down motion of the vehicle body 10 is shown to lag behind the change in the conditions of the traveling surface G. Subsequently, as shown in FIG. 12C, the center of gravity position B of the vehicle body 10 moves to a position higher than the center of gravity position B of the vehicle body 10 shown in FIG. 12A. The rotation axis P of the balance beam 33 moves together with the up-and-down motion of this center of gravity position B.

Therefore, when the right wheel 28R receives a shock, the state shown in FIG. 12B will arise first, which will then change to the state shown in FIG. 12C. This will particularly be described hereinafter.

First, as shown in FIG. 12B, when the shock is transmitted to the right shock absorber 31R, the right shock absorber 31R will contract. With the contraction of the right shock absorber 31R, the right wheel 28R moves up relative to the vehicle body 10. The balance beam 33 rotates in the other direction d2 about the rotation axis P. However, the position of the rotation axis P of the balance beam 33 does not change.

The left shock absorber 31L contracts. With the contraction of the left shock absorber 31L, the left wheel 28L moves up relative to the vehicle body 10. Thus, the shock received by the right wheel 28R is absorbed by the right shock absorber 31R and the left shock absorber 31L. As a result, the shock received by the right wheel 28R is barely transmitted to the vehicle body 10.

Subsequently, as shown in FIG. 12C, the rotation axis P of the balance beam 33 moves up with the center of gravity position B of the vehicle body 10. The right shock absorber 31R and the left shock absorber 31L each extend to the original amount of stroke. The original amount of stroke is each amount of stroke of the right shock absorber 31R and the left shock absorber 31L shown in FIG. 12A.

The above operation is an operation in which, when the vehicle body 10 is leaning by the predetermined amount θf1 to the left, the right wheel 28R moves up, and the lean amount θf of the vehicle body 10 decreases. Therefore, if a gentle enough shock occurs, an operation can take place as described in "3. Operation to lean the vehicle body". Specifically, a change can be made from the state of FIG. 12A directly to the state of FIG. 12C. However, when an abrupt shock occurs, a change goes through the state of FIG. 12B before reaching the state of FIG. 12C.

In the above example of operation, the left shock absorber 31L also contracts to contribute to absorption of the shock. However, this is not necessary such that the left shock absorber 31L does not need to contract and does not need to contribute to absorption of the shock. In the above example of operation the balance beam 33 rotates, but it does not necessarily need to rotate.

Reference is made to FIG. 13A and FIG. 13B. FIG. 13A and FIG. 13B are schematic views of the suspension mechanism provided to the front wheels when the saddle riding type vehicle with the vehicle body 10 leaning by the predetermined amount θf1 to the left is seen from the front. FIG. 13A shows a state of the saddle riding type vehicle running on a flat traveling surface G, and FIG. 13B shows a state of the right wheel 28R and the left wheel 28L running onto raised bulges on the traveling surface G.

Assume that the saddle riding type vehicle 1 is running with the vehicle body 10 leaning by the predetermined amount θf1 to the left as shown in FIG. 13A. When the right wheel 28R and the left wheel 28L each run onto bulges at this time as shown in FIG. 13B, the right wheel 28R and the left wheel 28L will both receive upward shocks. The shocks are transmitted to the right shock absorber 31R and the left shock absorber 31L, respectively.

The right shock absorber 31R contracts and absorbs the shock. Similarly, the left shock absorber 31L also contracts and absorbs the shock. Consequently, the right wheel 28R and the left wheel 28L move up, respectively. As a result, the shocks received by the right wheel 28R and the left wheel 28L are barely transmitted to the vehicle body 10. In this case, the balance beam 33 may rotate or may not rotate.

The case of the lean amount θf of the vehicle body 10 being less than the predetermined amount θf1 will be described taking for example the case where the vehicle body 10 is standing upright. Description will be made by further separating this case into a case where the left wheel 28L receives a shock, and a case where both of the right wheel 28R and the left wheel 28L receive shocks.

Reference is made to FIG. 14A to FIG. 14C. FIG. 14A to FIG. 14C are schematic views of the suspension mechanism provided to the front wheels when the saddle riding type vehicle with the vehicle body 10 standing upright is seen from the front. FIG. 14A shows a state of the saddle riding type vehicle running on a flat traveling surface G, and FIG. 14B and FIG. 14C show a state of the left wheel 28L running onto a raised bulge on the traveling surface G.

Assume that the saddle riding type vehicle 1 is running with the vehicle body 10 standing upright as shown in FIG. 14A. When the left wheel 28L runs onto a bulge at this time as shown in FIG. 14B, the left wheel 28L will receive a shock. The shock is transmitted to the left shock absorber 31L.

First, as shown in FIG. 14B, the left shock absorber 31L will contract. With the contraction of the left shock absorber 31L, the left wheel 28L moves up relative to the vehicle body 10. Thus, the shock received by the left wheel 28L is absorbed by the left shock absorber 31L. As a result, the shock received by the left wheel 28L is barely transmitted to the vehicle body 10.

Subsequently, as shown in FIG. 14C, the rotation axis P of the balance beam 33 moves up with the center of gravity position B of the vehicle body 10, and the balance beam 33 rotates in one direction dl. The left shock absorber 31L extends to the original amount of stroke.

Figure 15A:
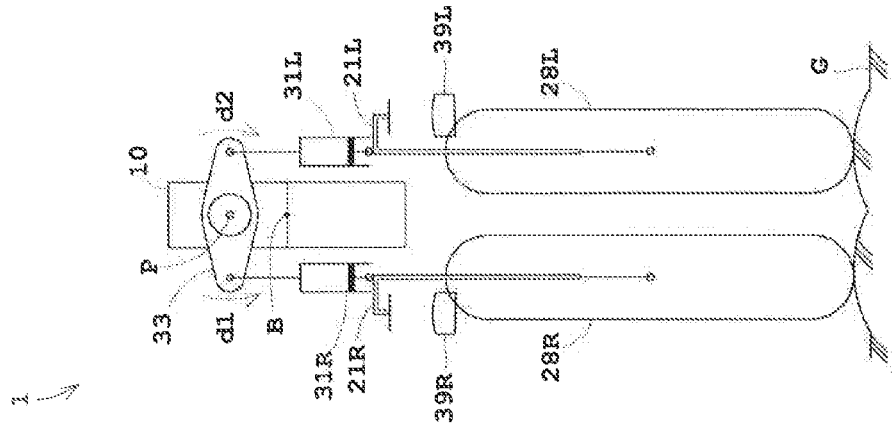
FIGS. 15A and FIG. 15B are schematic views of the suspension mechanism provided to the front wheels when the saddle riding type vehicle according to a preferred embodiment of the present invention with the vehicle body standing upright is seen from the front.
Figure 15B:
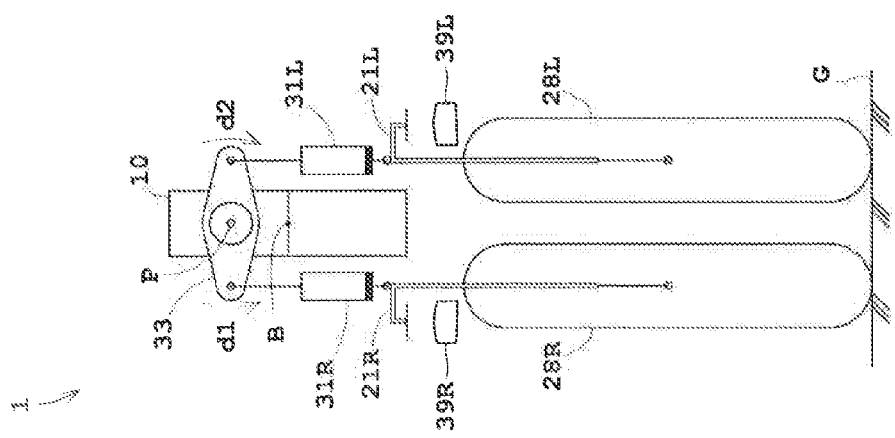

Reference is made to FIG. 15A and FIG. 15B. FIG. 15A and FIG. 15B are schematic views of the suspension mechanism provided to the front wheels when the saddle riding type vehicle with the vehicle body 10 standing upright is seen from the front. FIG. 15A shows a state of the saddle riding type vehicle running on a flat traveling surface G, and FIG. 15B shows a state of the right wheel 28R and the left wheel 28L running onto raised bulges on the traveling surface G.

Assume that the saddle riding type vehicle 1 is running with the vehicle body 10 standing upright as shown in FIG. 15A. When both the right wheel 28R and the left wheel 28L run onto bulges at this time as shown in FIG. 15B, the right wheel 28R and the left wheel 28L will each receive upward shocks. The shocks are transmitted to the right shock absorber 31R and the left shock absorber 31L, respectively.

As shown in FIG. 15B, the right shock absorber 31R contracts and absorbs the shock. Similarly, the left shock absorber 31L contracts and absorbs the shock. The right wheel 28R and the left wheel 28L move up, respectively. Thus, the shocks received by the right wheel 28R and the left wheel 28L are barely transmitted to the vehicle body 10. In this case, the balance beam 33 may rotate but the balance beam 33 does not need to rotate.

As described above, when the lean amount θf of the vehicle body 10 is less than the predetermined amount θf1, and even when the lean amount θf of the vehicle body 10 is the predetermined amount θf1, when the right wheel 28R and/or the left wheel 28L receive shock, the right shock absorber 31R and/or the left shock absorber 31L will absorb the shock conveniently.

Next, operations taking place when the right and left wheels 43 receive shocks from outside such as from the traveling surface G. A case of the lean amount θr of the vehicle body 10 being the predetermined amount θr1 and a case of the lean amount θr of the vehicle body 10 being less than the predetermined amount θr1 will be described separately below.

Description will be made taking for example the case where the lean amount θr of the vehicle body 10 is the predetermined amount θr1 to the right. Description will be made by separating this case into a case where the right wheel 43R receives a shock, a case where the left wheel 43L receives a shock, and a case where both of the right wheel 43R and the left wheel 43L receive shocks.

Reference is made to FIG. 16A and FIG. 16B. FIG. 16A and FIG. 16B are schematic views of the suspension mechanism provided to the rear wheels when the saddle riding type vehicle with the vehicle body 10 leaning by the predetermined amount θr1 to the right is seen from the back. FIG. 16A shows a state of the saddle riding type vehicle running on a flat traveling surface G, and FIG. 16B shows a state of the right wheel 43R running onto a raised bulge on the traveling surface G. FIG. 16A and FIG. 16B show, in lower portions thereof, positions (swing angles) of the carrier beam 51 relative to the vehicle body 10.

As shown in FIG. 16A, when the lean amount θr of the vehicle body 10 is the predetermined amount θr1 to the right, the stabilizer 53 is in contact with the left stopper member 61L. Consequently, the stabilizer 53 is stopped from swinging in the other direction e2 about the rotation axis Q. Therefore, a downward swing of the left rear arm 41L beyond the predetermined position is restricted. A further upward swing of the right rear arm 41R is restricted. The lower portion of FIG. 16A shows the carrier beam 51 in a position (orientation) of normal time around the pivot shaft 52. The phrase "normal time" means a time when the shock absorber 55 has a normal amount of stroke . Although the vehicle body 10 is not shown in the lower portion of FIG. 16A, the position (orientation) around the pivot shaft 52 of the carrier beam 51 corresponds to the position (swing angle) of the carrier beam 51 relative to the vehicle body 10.

When the saddle riding type vehicle 1 is running in such a state and the right wheel 43R runs onto a bulge as shown in FIG. 16B, the right wheel 43R will receive an upward shock from the traveling surface G. This shock is transmitted to the stabilizer 53 through the right rear arm 41R and the right rod 57R. The stabilizer 53 is subjected to a force acting to rotate the stabilizer 53 in the other direction e2 about the rotation axis Q. However, the left stopper member 61L is acting to stop rotation of the stabilizer 53 in the other direction e2 about the rotation axis Q. The shock is transmitted from the stabilizer 53 to the carrier beam 51 and the shock absorber 55.

Because of this shock, the shock absorber 55 preferably contracts. With the contraction of the shock absorber 55, as shown in the lower portion of FIG. 16B, the carrier beam 51 swings upward relative to the vehicle body, and the stabilizer 53 moves up relative to the vehicle body 10. Since the stabilizer 53 receives an upward force from the right rod 57R, the stabilizer 53 moves as if to rotate about the connecting point between the stabilizer 53 and the left rod 57L. Consequently, the right rod 57R moves up, the right rear arm 41R swings upward, and the right wheel 43R moves up. Therefore, the shock transmitted from the shock absorber 55 to the main frame 3 is decreased compared with the shock received by the right wheel 43R. That is, the shock received by the left wheel 43L is absorbed by the shock absorber 55, and is barely transmitted to the vehicle body 10.

Reference is made to FIG. 17A to FIG. 17C. FIG. 17A to FIG. 17C are schematic views of the suspension mechanism provided to the rear wheels when the saddle riding type vehicle with the vehicle body 10 leaning by the predetermined amount θr1 to the right is seen from the back. FIG. 17A shows a state of the saddle riding type vehicle running on a flat traveling surface G, and FIG. 17B and FIG. 17C show a state of the right wheel 28R running onto a raised bulge on the traveling surface G. FIG. 17A to FIG. 17C show in lower portions thereof positions (swing angles) of the carrier beam 51 relative to the vehicle body 10.

Assume that the saddle riding type vehicle 1 is running with the vehicle body 10 leaning by the predetermined amount θr1 to the right as shown in FIG. 17A. When the left wheel 43L runs onto a bulge at this time as shown in FIG. 17B, the left wheel 43L will receive an upward shock. This shock is transmitted to the stabilizer 53 through the left rear arm 41L and the left rod 57L. The stabilizer 53 is subjected to a force acting to rotate the stabilizer 53 in the one direction e1 about the rotation axis Q.

At this time, rotation of the stabilizer 53 in the one direction e1 about the rotation axis Q is preferably not stopped by the right stopper member 61R. However, when the stabilizer 53 rotates in the one direction e1, the stabilizer 53 will receive a reaction force from the right rod 57R, right rear arm 41R, right wheel 43R, and traveling surface G. The shock is transmitted from the stabilizer 53 to the carrier beam 51 and the shock absorber 55.

When the left wheel 43L runs onto the bulge, the vehicle body 10 will not move up immediately, because a force of inertia acts on the vehicle body 10. Therefore, the upper end of the shock absorber 55 connected to the vehicle body 10 (main frame 3) will also not move up immediately.

Therefore, when the left wheel 43L runs onto the bulge, the state shown in FIG. 17B will arise first, which will then change to the state shown in FIG. 17C. This will be described in detail hereinafter.

First, as shown in FIG. 17B, when the shock is transmitted to the shock absorber 55, the shock absorber 55 will contract. However, the position of the upper end of the shock absorber 55 does not change. With the contraction of the shock absorber 55, as shown in the lower portion of FIG. 17B, the carrier beam 51 swings upward relative to the vehicle body 10. Consequently, the stabilizer 53 moves up relative to the vehicle body 10. Since the stabilizer 53 receives an upward force from the left rod 57L, the stabilizer 53 moves as if to rotate about the connecting point between the stabilizer 53 and the right rod 57R. Consequently, the left rear arm 41L swings upward, and the left wheel 43L moves up relative to the vehicle body 10. Thus, the shock received by the left wheel 43L is absorbed by the shock absorber 55, and is barely transmitted to the vehicle body 10.

Subsequently, as shown in FIG. 17C, the upper end of the shock absorber 55 moves up with the center of gravity position B of the vehicle body 10. The shock absorber 55 extends to the original amount of stroke. The original amount of stroke of the shock absorber 55 shown in FIG. 17A is preferably a normal amount of stroke. The carrier beam 51, as shown in the lower portion of FIG. 17C, swings downward relative to the vehicle body, and the position (swing angle) of the carrier beam 51 relative to the vehicle body 10 returns to the position of normal time. Consequently, the stabilizer 53 moves down relative to the vehicle body 10.

The above operation is an operation in which the left wheel 41L moves up, and the lean amount θr of the vehicle body 10 decreases from the predetermined amount θr1. Therefore, if a gentle enough shock occurs, an operation can take place as described in section "3. Operation to lean the vehicle body" above. Specifically, a change can be made from the state of FIG. 17A directly to the state of FIG. 17C. However, when an abrupt shock occurs, a change goes through the state of FIG. 17B before reaching the state of FIG. 17C.

Reference is made to FIG. 18A and FIG. 18B. FIG. 18A and FIG. 18B are schematic views of the suspension mechanism provided to the rear wheels when the saddle riding type vehicle with the vehicle body 10 leaning by the predetermined amount θr1 to the right is seen from the back. FIG. 18A shows a state of the saddle riding type vehicle running on a flat traveling surface G, and FIG. 18B shows a state of the right wheel 43R and the left wheel 43L running onto raised bulges on the traveling surface G. FIG. 18A and FIG. 18B show in lower portions thereof positions (swing angles) of the carrier beam 51 relative to the vehicle body 10.

Assume that the saddle riding type vehicle 1 is running with the vehicle body 10 leaning by the predetermined amount θr1 to the right as shown in FIG. 18A. When the right wheel 43R and the left wheel 43L each run on bulges at this time as shown in FIG. 18B, the right wheel 43R and the left wheel 43L will each receive upward shocks. The shocks are transmitted to the shock absorber 55 through the stabilizer 53 and so on.

The shock absorber 55 contracts because of the shocks. With the contraction of the shock absorber 55, as shown in the lower portion of FIG. 18B, the stabilizer 53 moves up. The right rear arm 41R and the left rear arm 41R move up, respectively. The right wheel 43R and the left wheel 43L move up, respectively. Thus, the shocks received by the right wheel 43R and the left wheel 43L, respectively, are absorbed by the shock absorber 55 and thus are barely transmitted to the vehicle body 10. In this case, the stabilizer 53 may rotate, but it is also possible for the stabilizer 53 not to rotate.

The case of the lean amount θr of the vehicle body 10 being less than the predetermined amount θr1 will be described, for example, in a case where the vehicle body 10 is standing upright. Description will be made by further separating this case into a case where the right wheel 43R receives a shock, and a case where both of the right wheel 43R and the left wheel 43L receive shocks.

Reference is made to FIG. 19A to FIG. 19C. FIG. 19A to FIG. 19C are schematic views of the suspension mechanism provided to the rear wheels when the saddle riding type vehicle with the vehicle body 10 standing upright is seen from the back. FIG. 19A shows a state of the saddle riding type vehicle running on a flat traveling surface G, and FIG. 19B and FIG. 19C show a state of the right wheel 43R running onto a raised bulge on the traveling surface G. FIG. 19A to FIG. 19 C show in lower portions thereof positions (swing angles) of the carrier beam 51 relative to the vehicle body 10.

Assume that the saddle riding type vehicle 1 is running with the vehicle body 10 standing upright as shown in FIG. 19A. When the right wheel 43R runs onto a bulge at this time as shown in FIG. 19B, the right wheel 43R will receive a shock. The shock is transmitted to the shock absorber 55 through the stabilizer 53 and so on.

First, as shown in FIG. 19B, the shock absorber 55 will contract and absorb the shock. With the contraction of the shock absorber 55, as shown in the lower portion of FIG. 19B, the carrier beam 51 swings upward relative to the vehicle body 10. The stabilizer 53 moves up relative to the vehicle body 10. Since the stabilizer 53 receives an upward force from the right rod 57R, the stabilizer 53 moves as if to rotate about the connecting point between the stabilizer 53 and the left rod 57L. The right rear arm 41R swings upward, and the right wheel 43R moves up. Thus, the shock received by the right wheel 43R is barely transmitted to the vehicle body 10.

Subsequently, as shown in FIG. 19C, the upper end of the shock absorber 55 moves up with the center of gravity position B of the vehicle body 10. The shock absorber 55 extends to the original (i.e., normal) amount of stroke. As shown in the lower portion of FIG. 19C, the carrier beam 51 swings downward relative to the vehicle body 10. The position (swing angle) of the carrier beam 51 relative to the vehicle body 10 returns to the position of normal time. The stabilizer 53 moves downward relative to the vehicle body.

Reference is made to FIG. 20A and FIG. 20B. FIG. 20A and FIG. 20B are schematic views of the suspension mechanism provided to the rear wheels when the saddle riding type vehicle with the vehicle body 10 standing upright is seen from the back. FIG. 20A shows a state of the saddle riding type vehicle running on a flat traveling surface G, and FIG. 20B shows a state of the right wheel 43R and the left wheel 43L running onto raised bulges on the traveling surface G. FIG. 20A and FIG. 20B show in lower portions thereof positions (swing angles) of the carrier beam 51 relative to the vehicle body 10.

Assume that the saddle riding type vehicle 1 is running with the vehicle body 10 standing upright as shown in FIG. 20A. When the right wheel 43R and the left wheel 43L run onto bulges at this time, as shown in FIG. 20B, the right wheel 43R and the left wheel 43L will each receive upward shocks. The shocks are preferably transmitted to the shock absorber 55, respectively.

As shown in FIG. 20B, the shock absorber 55 contracts. With the contraction of the shock absorber 55, the stabilizer 53 moves up relative to the vehicle body 10. Consequently, the right rear arm 41R and the left rear arm 41R move up, respectively. The right wheel 43R and the left wheel 43L move up, respectively. Thus, the shocks received by the right wheel 43R and the left wheel 43L, respectively, are absorbed by the shock absorber 55, and are barely transmitted to the vehicle body 10. In this case, the stabilizer 53 may rotate, but it is also possible for the stabilizer 53 not to rotate.

As described above, of course in the case of the lean amount $\theta r$ of the vehicle body 10 being less than the predetermined amount $\theta r1$, and even in the case of the lean amount $\theta r$ of the vehicle body 10 being the predetermined amount $\theta r1$, when the right wheel 43R and/or the left wheel 43L receive a shock, the shock absorber 55 can conveniently absorb the shock. Therefore, the shock received by the right wheel 43R and/or the left wheel 43L is barely transmitted to the vehicle body 10.

Thus, the saddle riding type vehicle 1 according to the present preferred embodiment of the present invention, with the right stopper member 39R and the left stopper member 39L, stops the vehicle body 10 from leaning in excess of the predetermined amount $\theta f1$. Since the right lower arm 21R, left lower arm 21L and so on are prevented from swinging to excess, the suspension mechanism provided to the front wheels can be prevented from contacting other members of the saddle riding type vehicle 1. Similarly, since the right wheel 28R and the left wheel 28L are prevented from moving up and down to excess, the right and left wheels 28 can be prevented from contacting other members of the saddle riding type vehicle 1.

Similarly, the saddle riding type vehicle 1 according to the preferred embodiments of the present invention, with the right stopper member 61R and the left stopper member 61L, stops the vehicle body 10 from leaning in excess of the predetermined amount $\theta r1$. This can preferably prevent the suspension mechanism provided to the rear wheels or the right and left wheels 43 from contacting other members of the saddle riding type vehicle 1.

The right stopper member 39R and the left stopper member 39L, even when in contact with the right lower arm 21R and the left lower arm 21L, permit the lean amount $\theta f$ of the vehicle body 10 to decrease from the predetermined amount $\theta f1$. Therefore, also when the lean amount $\theta f$ of the vehicle body 10 is the predetermined amount $\theta f1$, the vehicle body 10 preferably does not become incapable of leaning.

Similarly, the right stopper member 61R and the left stopper member 61L, even when in contact with the stabilizer 53, permit the lean amount $\theta r$ of the vehicle body 10 to decrease from the predetermined amount $\theta r1$. Therefore, also when the lean amount $\theta r$ of the vehicle body 10 is the predetermined amount $\theta r1$, the vehicle body 10 preferably does not become incapable of leaning.

The right stopper member 39R and the left stopper member 39L do not contact the suspension mechanism provided to the front wheels when the lean amount $\theta f$ of the vehicle body 10 is less than the predetermined amount $\theta f1$. Therefore, the right stopper member 39R and the left stopper member 39L do not obstruct leaning of the vehicle body 10 when the lean amount $\theta f$ of the vehicle body 10 is less than the predetermined amount $\theta f1$. Therefore, in a range of the lean amount $\theta f$ of the vehicle body being less than the predetermined amount $\theta f1$, the lean amount $\theta f$ of the vehicle body can be freely increased and decreased.

Similarly, the right stopper member 61R and the left stopper member 61L do not contact the suspension mechanism provided to the rear wheels when the lean amount $\theta r$ of the vehicle body 10 is less than the predetermined amount $\theta r1$. Therefore, the right stopper member 61R and the left stopper member 61L do not obstruct leaning of the vehicle body 10 when the lean amount $\theta r$ of the vehicle body 10 is less than the predetermined amount $\theta r1$. Therefore, in a range of the lean amount $\theta r$ of the vehicle body being less than the predetermined amount $\theta r1$, the lean amount $\theta r$ of the vehicle body can be freely increased and decreased.

According to this preferred embodiment, as described above, the vehicle body 10 can freely lean in the range of the lean amount $\theta f$ of the vehicle body 10 being the predetermined amount $\theta f1$ or less. The vehicle body 10 can freely lean in the range of the lean amount $\theta r$ of the vehicle body 10 being the predetermined amount $\theta r1$ or less. According to the saddle riding type vehicle 1 constructed in this way, the rider can preferably travel comfortably.

The right stopper member 39R is disposed below the right lower arm 21R. Therefore, the right stopper member 39R does not interfere with the upward swing of the right lower arm 21R. Similarly, the left stopper member 39L is disposed below the left lower arm 21L. Therefore, the left stopper member 39L does not interfere with the upward swing of the left lower arm 21L. In other words, each of the stopper members 39R and 39L does not obstruct the motion of the suspension mechanism provided to the front wheels to move the right wheel 28R and the left wheel 28L upward.

Therefore, when the right and left wheels 28 receive shocks from the traveling surface G, the right shock absorber 31R and the left shock absorber 31L can conveniently contract and can thus absorb the shocks. Therefore, the shocks received by the right and the left wheel 28 from outside are barely transmitted to the vehicle body. Thus, the rider can travel with increased comfort.

The right and left wheels 28 are movable upward relative to the vehicle body by contraction of the right shock absorber 31R and the left shock absorber 31L. Consequently, up-and-down motions of the right and left wheels 28 are eased conveniently. Thus, the up-and-down motions of the right and left wheels 28 can preferably be prevented from being transmitted to the vehicle body 10.

Similarly, the right stopper member 61R and the left stopper member 61L are arranged to contact the stabilizer 53. Therefore, the right stopper member 61R and the left stopper member 61L do not interfere with the upward swing of the right rear arm 41R and the left rear arm 41L. In other words, each of the stopper members 61R and 61L does not obstruct the motion of the suspension mechanism provided to the rear wheels to move the right wheel 43R and the left wheel 43L upward.

Therefore, when the right and left wheels 43 receive shocks from the traveling surface G, the shock absorber 55 can conveniently contract and can absorb the shocks. Therefore, the shocks received by the right and left wheels 43 from outside are barely transmitted to the vehicle body. Thus, the rider can preferably travel with increased comfort.

The right and left wheels 43 are movable upward relative to the vehicle body 10 by contraction of the shock absorber 55. Consequently, up-and-down motions of the right and left wheels 43 are eased. Thus, the up-and-down motions of the right and left wheels 43 can preferably be prevented from being transmitted to the vehicle body 10.

The above right stopper member 39R and left stopper member 39L are supported by the main frame 3. Therefore, the right stopper member 39R and the left stopper member 39L can preferably be provided firmly. Therefore, even if a major load is applied to the right stopper member 39R, the right lower arm 21R can reliably be stopped from swinging downward beyond the predetermined position. Similarly, even if a major load is applied to the left stopper member 39L, the left lower arm 21L can reliably be stopped from swinging downward beyond the predetermined position.

The above right stopper member 61R and left stopper member 61L are supported by the carrier beam 51. Therefore, even when the carrier beam 51 swings, the relative position between the stabilizer 53, right stopper member 61R, and left stopper member 61L will not change. Therefore, the range of free rotation of the stabilizer 53 can preferably be maintained constant. Here, the range of free rotation of the stabilizer 53 corresponds to the range of the lean amount θr where the vehicle body 10 can freely lean right and left. Therefore, the range of the lean amount θr in which the vehicle body 10 is freely rotatable can be maintained constant. Even when the stabilizer 53 moves up and down by the swing of the carrier beam 51, the right stopper member 61R and the left stopper member 61L do not obstruct an upward movement of the stabilizer 53. This can promote the degree of freedom for arranging the right stopper member 61R and the left stopper member 61L.

Preferred embodiments of the present invention are not limited to the foregoing preferred embodiments, but may be modified as follows:

(1) In the foregoing preferred embodiments, the right stopper member 39R and the left stopper member 39L preferably stop the swinging of the right lower arm 21R and the left lower arm 21L, respectively, but this is not limitative. For example, a change may be made to the stopper members arranged to stop swinging of the right upper arm 23R and the left upper arm 23L. Further, a change may be made to the stopper members arranged to stop up-and-down motions of the right knuckle arm 25R and the left knuckle arm 25L. Or a change may be made to the stopper members arranged to restrict the range in which the balance beam 33 can freely rotate. These modifications can also conveniently stop the vehicle body 10 from leaning in excess of the predetermined amount θf1. The right shock absorber 31R and the left shock absorber 31L can conveniently absorb the shocks received by the right wheel 28R and the left wheel 28L, respectively.

(2) In the foregoing preferred embodiments, the right stopper member 61R and the left stopper member 61L preferably restrict the range in which the stabilizer 53 can rotate freely, but this is not limitative. For example, a change may be made to the stopper members arranged to stop the swings of the right rear arm 41R and the left rear arm 41L. Or a change may be made to the stopper members arranged to stop movements of the right rod 57R and the left rod 57L. These modifications can also conveniently stop the vehicle body 10 from leaning in excess of the predetermined amount θr1. The shock absorber 55 can absorb conveniently the shocks received by the right wheel 43R and the left wheel 43L.

(3) The foregoing preferred embodiments preferably provide a plurality of discrete stopper members (i.e. the right stopper member 39R and the left stopper member 39L), but this is not limitative. For example, a change may be made to a single stopper member provided in an integrated manner.

(4) The foregoing preferred embodiments preferably provide a plurality of discrete stopper members (i.e. the right stopper member 61R and the left stopper member 61L), but this is not limitative. For example, a change may be made to a single stopper member provided in an integrated manner.

(5) In the foregoing preferred embodiments, the right stopper member 39R and the left stopper member 39L are preferably arranged on the main frame 3, but this is not limitative. For example, a change may be made to stopper members arranged on the pivot shaft 22 arranged to restrict the range in which the right lower arm 21R and the left lower arm 21L can swing freely relative to the pivot shaft 22.

(6) In the foregoing preferred embodiments, the right stopper member 61R and the left stopper member 61L are preferably arranged below the stabilizer 53, but this is not limitative. A change may be made to arrange them above the stabilizer 53. Or a change may be made to stopper members arranged on the rotation axis Q of the stabilizer 53 arranged to restrict the range in which the stabilizer 53 can freely rotate relative to the rotation axis Q.

(7) In the foregoing preferred embodiments, when the right lower arm 21R is not located in the predetermined position, the right stopper member 39R and the right lower arm 21R preferably are not in contact (out of contact), but this is not limitative. For example, a change may be made to a stopper member which is constantly in contact with the right lower arm 21R. For example, a change may be made to a flexible member, such as a wire, connected to the right lower arm 21R to stop, with its pulling force, the right lower arm 21R from swinging downward beyond the predetermined position. The right stopper member 39R is preferably disposed below the right lower arm 21R, which is not limitative. A change may be made, depending on the construction of the stopper member, to install it laterally of or above the right lower arm 21R. The left stopper member 39L may be changed similarly.

(8) In the foregoing preferred embodiments, the opposite ends of the right shock absorber 31R are preferably connected directly to the balance beam 33 and the right lower arm 21R, but this is not limitative. For example, a change may be made to indirectly connect the right shock absorber 31R and the balance beam 33. The right shock absorber 31R and the right lower arm 21R may be indirectly connected. Similar changes may be made to the left stopper member 39L. Such modified preferred embodiments can also absorb conveniently the shocks received by the right and left wheels 28 by means of the right shock absorber 31R and so on.

(9) The foregoing preferred embodiments preferably provide both the stopper members (39R, 39L) arranged to contact the suspension mechanism provided to the front wheels, and the stopper members (61R, 61L) arranged to contact the suspension mechanism provided to the rear wheels, but this is not limitative. For example, a change may be made to omit the stopper members (39R, 39L). A change may be made to omit the stopper members (61R, 61L). Even if a change is made to provide either the stopper members (39R, 39L) or the stopper members (61R, 61L), the vehicle body 10 can still be conveniently prevented from leaning in excess of the predetermined amount.

(10) Preferred embodiments of the present invention do not need to have both the suspension mechanism provided to the front wheels and the suspension mechanism provided to the rear wheels described in the foregoing preferred embodiments. For example, a change may be made to provide only one of the suspension mechanism provided to the front wheels and the suspension mechanism provided to the rear wheels described in the foregoing preferred embodiments.

(11) The foregoing preferred embodiments preferably show a four-wheeled automotive vehicle including a pair of front wheels (right and left wheels 28) and a pair of rear wheels (right and left wheels 43), but this is not limitative. A change may be made to a three-wheeled vehicle including a single front wheel and a pair of rear wheels. A change may be made to a three-wheeled vehicle including a pair of front wheels and a single rear wheel.

(12) The foregoing preferred embodiments preferably provide the engine 17 as power source, but this is not limitative. A change may be made to provide an electric machine (i.e., a motor) as power source. In this case, the engine 17 may be omitted, or both the engine 17 and the electric motor may be provided.

(13) The preferred embodiments and the modified preferred embodiments described in examples (1) to (12) above may be further varied as appropriate by replacing or combining certain components with other modified preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A saddle riding vehicle that makes turns by leaning a vehicle body, the saddle riding vehicle comprising:
a right wheel and a left wheel provided at opposite sides of the vehicle body;
a suspension mechanism provided on the vehicle body to support the right wheel and the left wheel to be movable up and down in mutually opposite directions; and
a stopper member that contacts the suspension mechanism to stop the vehicle body from leaning in excess of a predetermined amount when a lean amount of the vehicle body becomes the predetermined amount; wherein
the suspension mechanism includes:
a buffer that absorbs a shock received by at least one of the right wheel and the left wheel from outside even when the suspension mechanism is in contact with the stopper member;
a right support mechanism swingably provided on the vehicle to support the right wheel to be movable up and down;
a left support mechanism swingably provided on the vehicle to support the left wheel to be movable up and down;
a balancer member that links a swinging of the right support mechanism and a swinging of the left support mechanism so as to allow the right wheel and the left wheel to move up and down in the mutually opposite directions; and
a carrier beam member swingably provided on the vehicle to support the balancer member to be rotatable about a rotation axis and to be movable up and down;
the buffer is disposed between the vehicle body and the carrier beam member; and
the stopper member contacts the suspension mechanism without obstructing an upward movement of the balancer member, an upward swinging of the right support mechanism, and an upward swinging of the left support mechanism.

2. The saddle riding vehicle according to claim 1, wherein the stopper member is separated from the suspension mechanism when the lean amount of the vehicle body is less than the predetermined amount.

3. The saddle riding vehicle according to claim 1, wherein:
the stopper member is in a position deviated from above the right support mechanism and above the left support mechanism.

4. The saddle riding vehicle according to claim 1, further comprising:
a second right wheel; and
a second left wheel; wherein
the right wheel, the second right wheel, the left wheel, and the second left wheel are arranged as a pair of front wheels and a pair of rear wheels; and
the suspension mechanism supports at least one of the pair of front wheels and the pair of rear wheels.

5. The saddle riding vehicle according to claim 1, wherein the stopper member contacts the balancer member to restrict a freely rotatable range of the balancer member without obstructing an upward movement of the balancer member.

6. The saddle riding vehicle according to claim 5, wherein the stopper member is supported by one of the carrier beam member and the vehicle body.

7. The saddle riding vehicle according to claim 5, wherein the stopper member includes:
a first stopper member that stops the balancer member from rotating in one direction about the rotation axis; and
a second stopper member that stops the balancer member from rotating in the other direction about the rotation axis.

8. The saddle riding vehicle according to claim 1, wherein the stopper member contacts the right support mechanism to stop the right support mechanism from swinging downward from a predetermined position thereof without obstructing an upward swing of the right support mechanism, and contacts the left support mechanism to stop the left support mechanism from swinging downward from a predetermined position thereof without obstructing an upward swing of the left support mechanism.

9. The saddle riding vehicle according to claim 8, wherein the stopper member is disposed below the right support mechanism and below the left support mechanism.

10. The saddle riding vehicle according to claim 8, wherein the stopper member is supported by the vehicle body.

11. A saddle riding vehicle that makes turns by leaning a vehicle body, the saddle riding vehicle comprising:
a right wheel and a left wheel provided at opposite sides of the vehicle body;
a suspension mechanism provided on the vehicle body to support the right wheel and the left wheel to be movable up and down in mutually opposite directions; and
a stopper member that contacts the suspension mechanism to stop the vehicle body from leaning in excess of a predetermined amount when a lean amount of the vehicle body becomes the predetermined amount; wherein the suspension mechanism includes:
- a buffer that absorbs a shock received by at least one of the right wheel and the left wheel from outside even when the suspension mechanism is in contact with the stopper member;
- a right support mechanism swingably provided on the vehicle to support the right wheel to be movable up and down;
- a left support mechanism swingably provided on the vehicle to support the left wheel to be movable up and down; and
- a balancer member that is rotatably supported by the vehicle body and links a swinging of the right support mechanism and a swinging of the left support mechanism so as to allow the right wheel and the left wheel to move up and down in the mutually opposite directions;

the buffer includes:
- a right buffer disposed between the balancer member and the right support mechanism; and
- a left buffer disposed between the balancer member and the left support mechanism; and the stopper member contacts the suspension mechanism without obstructing an upward swing of the right support mechanism and an upward swing of the left support mechanism.

12. The saddle riding vehicle according to claim 11, wherein the stopper member contacts the balancer member to restrict a freely rotatable range of the balancer member.

13. The saddle riding vehicle according to claim 11, wherein the stopper member is separated from the suspension mechanism when the lean amount of the vehicle body is less than the predetermined amount.

14. The saddle riding vehicle according to claim 11, wherein:
the stopper member is in a position deviated from above the right support mechanism and above the left support mechanism.

15. The saddle riding vehicle according to claim 11, further comprising:
- a second right wheel; and
- a second left wheel; wherein
- the right wheel, the second right wheel, the left wheel, and the second left wheel are arranged as a pair of front wheels and a pair of rear wheels; and
- the suspension mechanism supports at least one of the pair of front wheels and the pair of rear wheels.

* * * * *